United States Patent [19]
Touma et al.

[11] Patent Number: 6,167,159
[45] Date of Patent: Dec. 26, 2000

[54] TRIANGLE MESH COMPRESSION

[75] Inventors: Costa Touma, Natzereth; Craig Gotsman, Haifa, both of Israel

[73] Assignee: Virtue Ltd., Tirat Hacarmel, Israel

[21] Appl. No.: 09/070,607

[22] Filed: Apr. 30, 1998

[51] Int. Cl.$^7$ .............................. G06K 9/36; G06T 15/00; G06T 11/20

[52] U.S. Cl. .......................... 382/242; 382/243; 345/419; 345/440

[58] Field of Search .................................... 382/243, 241, 382/238, 242, 232; 345/420, 418, 202, 419, 440

[56] References Cited

U.S. PATENT DOCUMENTS

| | | | |
|---|---|---|---|
| 5,736,987 | 4/1998 | Drucker et al. | 382/242 |
| 5,793,371 | 8/1998 | Deering | 382/242 |
| 5,825,369 | 10/1998 | Rossignac et al. | 345/440 |
| 6,046,744 | 4/2000 | Hoppe | 345/419 |
| 6,047,088 | 4/2000 | van Beek et al. | 382/243 |

OTHER PUBLICATIONS

"Principles of Interactive Computer Graphics," Newman et al., McGraw–Hill, 1979, p. 399.

Brochure: "Mesh Compression: A Must for Useful VRML", Virtue Ltd., Nov. 13, 1997.

G. Taubin et al., "Geometric Compression Through Topological Surgery", Research Report RC–20340, IBM Research Division, 1996.

http://www.research.ibm.com/vrml/binary/specification VRML97 Specification, ISO/IEC 14772–3 "The Virtual Reality Modeling Language Compressed Binary Format Specification" Editor's Draft 5 Oct. 15, 1997.

*Primary Examiner*—Thomas D. Lee
*Assistant Examiner*—Wenpeng Chen
*Attorney, Agent, or Firm*—Ladas & Parry

[57] ABSTRACT

A method for compressing a mesh having a plurality of vertices, each vertex characterized by a degree equal to the number of edges incident thereon, including arranging substantially all of the vertices in a consecutive order, generating a topology list including the degrees of the vertices in the consecutive order, and providing a coded stream of signals including the topology list.

97 Claims, 24 Drawing Sheets

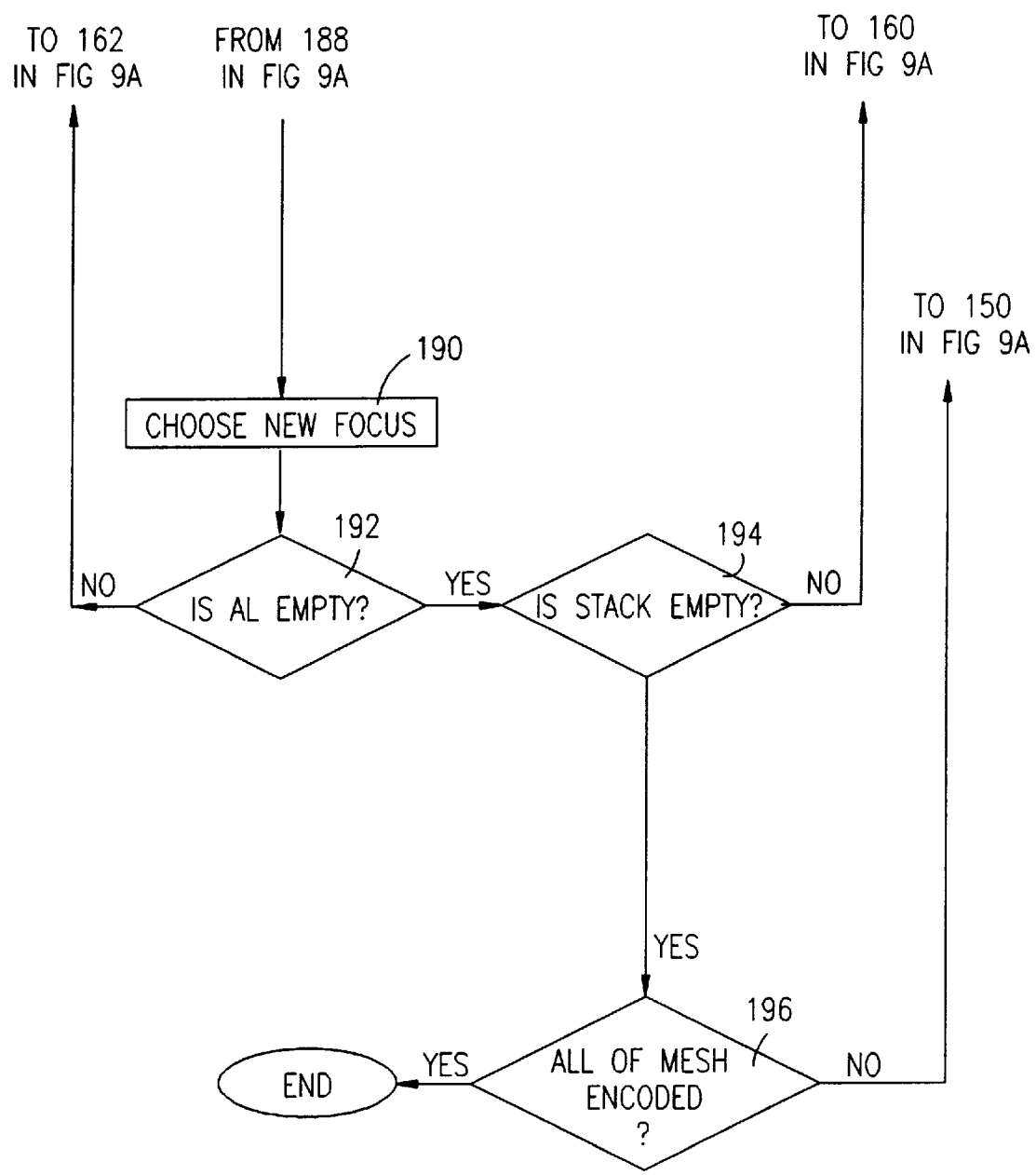

TRIANGLE MESH COMPRESSION

FIELD OF THE INVENTION

The present invention relates generally to data compression and transmission, and particularly to triangle mesh compression of computer graphics.

BACKGROUND OF THE INVENTION

The advent of powerful computers and large storage disks, such as CD-ROMs, in recent years, has brought with it a surge in production and use of sophisticated multimedia graphics applications. In order to transmit such applications over the Internet, new data types have been defined, including three-dimensional triangle mesh data objects. Files used with the VRML97 graphics standard include such types of three dimensional objects. VRML97 files represent graphic objects using ASCII-based data and have large amounts of redundancy.

Generally, a three-dimensional triangle mesh object comprises a plurality of triangles identified by their vertices. The triangle mesh is represented by a list of triangles, in which for each triangle the coordinates of its three vertices are indicated. The information in the list includes the coordinates of the vertices, and indication of which vertices belong to each triangle. The information regarding the coordinates is referred to as the geometry of the object, while information pertaining to which vertices belong to each triangle is referred to as the topology or connectivity of the object.

A triangle mesh representation of a complex, three-dimensional object generally includes a large volume of data. However, the communication lines through which such data may be transferred over the Internet or other networks typically have a limited average rate of data transfer, commonly referred to as bandwidth. Therefore, it is important to compress data objects as best possible before transfer. The better the compression method which is used, the more data can be transferred in a given amount of time.

A scheme for compression of VRML97 graphics files has been suggested by IBM (http://www.research.ibm.com/vrml/binary/specification). This scheme involves tokenizing the ASCII content of the files into binary form and compressing the data using a polygonal mesh compression algorithm due to Taubin, et al. (G. Taubin and J. Rossignac, "Geometric compression through topological surgery," Research Report RC-20340, IBM Research Division, 1996). Taubin's algorithm compresses the geometry data by quantizing the coordinates of the mesh to 8, 10 or 12 bits and then using a linear prediction algorithm. The integer prediction errors are encoded by an entropy rate algorithm. In average cases, Taubin achieves a compression rate of about 13 bits per vertex for the geometry data.

However, better compression schemes are sought in order to allow more rapid transfer of three dimensional data objects.

SUMMARY OF THE INVENTION

It is an object of some aspects of the present invention to provide improved methods of compression of VRML format files.

It is another object of some aspects of the present invention to provide apparatus and methods of compression to allow fast transfer of three dimensional (3D) objects over a network.

It is yet another object of some aspects of the present invention to provide improved methods for compact storage of 3D objects.

In some aspects of the present invention, a three dimensional triangle mesh, typically corresponding to a 3D graphic object, is compressed before transmission from a sending computer to a receiving computer. The sending computer performs a compression procedure which compresses the mesh, and the receiving computer performs a compatible decompression procedure. Preferably, the codes required for the compression and decompression procedures are small, such that they may be transmitted between the computers in an amount of time substantially smaller than the transmission time of an average triangle mesh object.

In some preferred embodiments of the present invention, the compression procedure includes arranging the vertices of the mesh in a consecutive order. Preferably, two lists, a topology list and a coordinate list, are generated including, respectively, the topology and coordinate data of the mesh. Preferably, the data in the lists pertain consecutively to the vertices of the mesh in the consecutive order. The topology list represents the topology of the mesh by the degrees of the vertices, i.e., according to the number of edges that are incident on each of the vertices. The coordinate list includes geometric coordinates, preferably in encoded form, of the vertices in the consecutive order.

Preferably, the consecutive order is chosen such that the triangle mesh may be reconstructed solely using these two lists, and most preferably, such that the topology may be reconstructed using only the topology list. As further described hereinbelow, the inventors have found that this procedure provides more effective compression of triangle mesh objects than any method known in the art, while providing substantially faithful reproduction of the objects after transmission and decompression.

In some preferred embodiments of the present invention, the consecutive order of the vertices is formed of at least one sub-list in which the vertices are ordered along a contour of the mesh, i.e., each two successive vertices in the sub-list are connected by an edge which belongs to a triangle in the object. Preferably, the edges connecting successive vertices in the sub-lists form a winding path having a predetermined characteristic, such as a clockwise or counter-clockwise spiral form. It is noted that in triangle meshes which are manifolds, i.e., have no singular edges or vertices (as defined hereinbelow), as in all polygonal meshes which are manifolds, the edges incident on any vertex can be ordered in a clockwise order. This characteristic of manifolds is sufficient in order to enable the topology of any triangle mesh object to be represented using the topology list, as described hereinabove.

When the triangle mesh comprises a non-orientable mesh, i.e., a triangle mesh in which not all of the pairs of adjacent triangles in the mesh can have their vertices ordered in the same order (clockwise or counter-clockwise), the mesh is preferably transformed to an orientable form, as is known in the art.

In preferred embodiments of the present invention, objects which have boundary edges are transformed to objects without boundary edges before generating the topology list. Boundary edges are defined as edges which belong to only one triangle, in contrast to internal edges which belong to exactly two triangles. Edges belonging to three or more triangles are referred to as singular edges. Likewise, an internal vertex is one whose neighboring vertices, i.e., the vertices of all the triangles that contain the given vertex, excluding the given vertex itself, can be contained in a single loop. In contrast, the neighboring vertices of a boundary vertex cannot form a path that is a loop, but can form a single path that is not a loop. A singular vertex is neither an internal nor a boundary vertex.

Preferably, before generating the topology list, the object is scanned for boundaries, and if boundaries are found, they are canceled. In a preferred embodiment of the present invention, the boundaries are canceled by adding for each boundary a dummy vertex which is connected by edges to all the vertices on the boundary. At the end of the decompression procedure, after the topology is reconstructed from the topology list, the dummy vertices are removed. Preferably, the dummy vertices are identified by a special code in the topology list. Alternatively or additionally, the dummy vertices are identified in the coordinate list by a special code which is not used for designating coordinates.

In some preferred embodiments of the present invention, the object cannot be traversed by a single winding path, and therefore the topology list includes a chain of sublists, each sublist describing one winding path. Preferably, the list includes commands which indicate the vertices at which such sublists begin.

In some preferred embodiments of the present invention, the degrees and the commands in the topology list are encoded as binary numbers in a compressed format. Preferably, entropy coding is used, such as a Huffman code based on the occurrence of the degrees and/or commands in a generalized mesh. Alternatively, the Huffman code is chosen according to the occurrence of the degrees and/or commands in the specific mesh corresponding to the object, and an index to the code is appended to the topology list. Preferably, the commands inserted into the list are also encoded in the Huffman code.

Preferably, run-length encoding is applied to the compressed binary format of the topology list. Alternatively or additionally, run-length encoding is applied to the topology list before it is compressed.

In tests performed on standard meshes, the compression of topology information in accordance with preferred embodiments of the present invention achieved a compression rate of about 1 bit per vertex. When performed on meshes with regular topologies, in which most of the vertices have the same degree, a compression rate of about 0.2 bits per vertex has been achieved.

In some preferred embodiments of the present invention, a beginning vertex in the consecutive order is chosen so as to minimize the size of the encoded topology list. Alternatively or additionally, other parameters of the compression process are chosen so as to minimize the size. One such parameter may be the ordering of the edges incident on the vertices, i.e., clockwise, counter-clockwise or otherwise. In some of these preferred embodiments, the beginning vertex and/or other parameters are chosen by performing the compression process on a few alternative beginning vertices or parameters, and choosing the process which achieves the most compressed list. Alternatively, the beginning vertex and/or parameters are chosen according to known characteristics of the mesh object.

In preferred embodiments of the present invention, the coordinate information of the mesh is incorporated in the coordinate list using a linear prediction scheme, wherein for most of the vertices, the vertex coordinates are represented by an offset between a prediction of the coordinates and the actual coordinates. Preferably, the prediction is based on more than one other vertex appearing earlier in the consecutive order, more preferably on at least three such vertices, and most preferably, when possible, on at least five vertices. In one preferred embodiment, the prediction of the coordinates of a vertex is performed based on the coordinates of vertices of a triangle adjacent the predicted vertex, wherein the predicted vertex preferably forms a parallelogram with the three vertices of the triangle.

In further preferred embodiments of the present invention, the prediction coordinates are adjusted to take into account that the predicted vertex is not necessarily coplanar with the former vertices. Preferably, an estimated crease angle, which estimates the angle between a triangle containing the predicted vertex and the adjacent triangle, is calculated. Preferably, the triangle containing the predicted vertex and the adjacent triangle have a common edge, and most preferably they form together a figure approximating a parallelogram, which is creased along a diagonal thereof corresponding to the common edge. In one of these preferred embodiments, the estimated crease angle is based on the crease angles of one or more pairs of triangles adjacent the predicted vertex. Preferably, the crease angle is an average of the angles between two or more pairs of triangles whose common edges are closest to being parallel to the common edge between the triangle containing the predicted point and its adjacent triangle. Alternatively or additionally, non-linear prediction methods are used to enhance the prediction accuracy.

Preferably, the offsets between the predictions and the actual coordinates are encoded in the coordinate list using an offset compression scheme. Preferably, the offset compression scheme includes generating an explicit codebook including those offset values that arise most frequently. Further preferably, offset values which do not appear in the codebook are encoded by a fixed rate code. Preferably, the codebook includes values surrounding zero and includes between 16 to 128 values, most preferably 32 values. The codebook is preferably kept small, so as to reduce the file size of the compression and decompression procedures. In a preferred embodiment of the present invention, a common, standard codebook is used for all objects. In an alternative embodiment, the size of the codebook and its contents are dynamically determined according to the size of the object and its complexity. In this embodiment, the codebook is transmitted along with the object and therefore is preferably kept especially small.

In preferred embodiments of the present invention, the coordinates are quantized before they are compressed using any quantization method known in the art, for example, as described in the above-mentioned report by Taubin et al. Preferably, each coordinate is quantized to between 8–12 bits.

In some preferred embodiments of the present invention, the quantization is performed adaptively as a function of local characteristics of the mesh, such as a local resolution of areas in the object. For example, in areas where there are many details the quantization may be to 12 bits, while in sparse areas the quantization may be reduced to 8 bits.

In preferred embodiments of the present invention, encoding of the coordinates is performed in parallel with the topology encoding, so that the entire compression is performed in a single pass. Alternatively, the coordinate encoding is performed separately after topology encoding so that all of the topology information may be used for achieving predictions closer to the actual value, so that prediction errors are reduced and/or the compressed file size is minimized.

Some 3D triangle meshes include in addition to the topology and coordinates, information regarding normals to surfaces at some or all of the vertices in the mesh. In some preferred embodiments of the present invention, these normals are encoded along with the topology and coordinate lists. Preferably, the normals are encoded using a prediction method in which the prediction is based on an averaged surface normal of adjacent triangles. Alternatively or additionally, the prediction of the normal at a specific vertex, is based on the normals of vertices preceding the vertex in the lists. The difference between the averaged surface normal and the normal at the vertex is encoded in a normal list, preferably by stating two angles which indicate the difference between the orientation of the predicted normal and the actual normal at the vertex.

Further preferably, the differences are encoded using a group of predetermined angles, from which the closest angle is indicated. Preferably, the predetermined angles include points on a sphere which indicate both of the two angles. Alternatively, the angles are encoded separately.

Preferably, the prediction is calculated as the average of the normals of the triangles including the vertex. Alternatively, the prediction is calculated using only the triangles which were already encoded prior to making the prediction. The normals are preferably calculated based on the coordinates of the triangles after quantization, such that identical values are used for prediction during compression and decompression.

It is noted that although the above description relates to three dimensional triangle mesh objects, the principles of the present invention may be applied, mutatis mutandis, to objects of other dimensionalities and objects represented by higher-order polygons.

It is further noted that although the above description emphasizes the advantages of the present invention for data transmission and storage, the principles of the present invention may also be applied to achieve more efficient rendering of compressed objects. Special hardware-based rendering devices are commonly used for rendering triangle mesh objects. In hardware-based devices, the coordinates of the object are commonly passed down a pipeline in which the coordinates undergo geometric projection and clipping. Because memory in these rendering devices is limited, the results of the geometric projection and clipping are not saved for future use of the same vertex, and the clipping and projection are typically repeated several times. Therefore, the time of rendering is dependent on the number of vertices passed down the pipeline, rather than the number of vertices in the object. When the triangles are passed substantially randomly down the pipeline, as is known in the art, each vertex passes down the line about six times.

However, when the triangles and vertices are ordered in accordance with the principles of the present invention, such that generally each new triangle extracted from the topology list has an edge in common with the previous extracted triangle, each vertex is sent down the pipeline only twice on the average, since two out of three of the vertices in the triangle do not require another pass in the pipeline. Thus, the rendering proceeds more efficiently.

There is therefore provided in accordance with a preferred embodiment of the present invention, a method for compressing a mesh having a plurality of vertices, each vertex characterized by a degree equal to the number of edges incident thereon, including arranging substantially all of the vertices in a consecutive order, generating a topology list including the degrees of the vertices in the consecutive order and providing a coded stream of signals including the topology list.

Preferably, arranging the vertices in the consecutive order includes arranging the vertices in at least one sub-list in which the vertices are ordered along a contour of the mesh.

Preferably, the contour has a generally spiral shape.

Preferably, the at least one sub-list includes a number of sub-lists, the number determined according to a characteristic of the mesh.

Preferably, generating the topology list includes inserting into the topology list an indication of the vertices at which two of the number of sub-lists meet.

Preferably, arranging the vertices in the consecutive order includes arranging the vertices such that a topology of the mesh may be regenerated using substantially only the topology list.

Preferably, the method further includes checking whether the mesh has an open boundary and adding a dummy vertex which is connected to vertices on the open boundary, if the mesh has an open boundary.

Preferably, providing the coded stream of signals includes compressing the topology list.

Preferably, compressing the topology list includes applying an entropy coding algorithm and/or a Huffman algorithm.

Preferably, applying the entropy coding algorithm includes using a compression table according to a general frequency count.

Alternatively or additionally, applying the entropy coding algorithm includes using a compression table according to a frequency count of the degrees in the topology list.

Preferably, the vertices have respective geometric coordinates, and providing the stream of signals includes providing a list of the coordinates.

Preferably, providing the coordinate list includes compressing the coordinates.

Preferably, compressing the coordinates includes representing the coordinates of at least one of the vertices as an offset from a respective predicted value.

Preferably, the predicted value is calculated based on coordinates of a plurality of previous vertices in the consecutive order.

There is further provided in accordance with a preferred embodiment of the present invention, a method for compressing a mesh including a plurality of vertices having geometric coordinates, including arranging the vertices in a consecutive order, compressing the coordinates so as to generate a compressed coordinate list in which the coordinates of at least one of the vertices are represented as an offset from a predicted value, which is calculated based on the coordinates of a plurality of the preceding vertices in the consecutive order, and providing a coded stream of signals including the compressed coordinate list.

Preferably, the predicted value is calculated based on the coordinates of at least three preceding vertices.

Alternatively or additionally, the predicted value is calculated based on topology information relating to at least some of the vertices in the mesh.

Preferably, the predicted value is calculated by calculating coordinates of a point which forms a parallelogram together with an adjacent triangle.

Further preferably, the predicted value is calculated by calculating an estimated crease angle between an adjacent triangle and a triangle including the point.

Preferably, calculating the estimated crease angle includes determining a crease angle between adjacent planes which include pairs of neighboring triangles.

Further preferably, calculating the estimated crease angle includes finding at least one pair of triangles which has a common edge closest to parallelism with an edge about which the crease angle is estimated.

Preferably, the at least one pair of triangles includes at least two pairs of triangles which have respective crease angles therebetween, and the estimated crease angle includes an average of the crease angles of the at least two pairs of triangles.

Preferably, compressing the coordinates includes representing the offsets using a codebook.

Preferably, the method includes adaptively quantizing the coordinates responsive to a local characteristic of the mesh.

Preferably, providing the coded stream of signals includes storing the stream of signals in a memory.

Alternatively or additionally, providing the coded stream of signals includes transferring the stream of signals over a network.

There is further provided in accordance with preferred embodiments of the present invention, a method for decoding a stream of signals into a mesh including a plurality of vertices, each vertex characterized by a degree equal to the number of edges incident thereon, including extracting a topology list, including a series of numbers representing the degrees of the vertices in a consecutive order, from the stream, and generating the mesh with the vertices having the degrees in accordance with the topology list.

Preferably, extracting the topology list includes extracting at least one sub-list in which the degrees of the vertices are ordered along a predetermined contour of the mesh.

Preferably, the predetermined contour has a generally spiral shape.

Preferably, the at least one sub-list includes a plurality of sub-lists, and wherein extracting the topology list includes extracting an indication of the vertices at which two or more of the sub-lists meet.

Preferably, the method includes identifying dummy vertices and removing them from the mesh.

Preferably, the stream of signals includes compressed data, and wherein extracting the topology list includes decompressing the data to determine the series of numbers representing the degrees.

Preferably, decompressing includes decompressing according to an entropy coding algorithm.

Further preferably, decompressing according to the entropy coding algorithm includes using a compression table according to a general frequency count.

Preferably, the method includes extracting a coordinate list representing geometric coordinates of the vertices from the stream and decompressing the coordinate list.

Preferably, decompressing the coordinate list includes extracting from the coordinate list at least one value representing an offset between an actual coordinate and a predicted coordinate.

Preferably, the method includes calculating a predicted value for at least one vertex corresponding to the at least one value representing the offset, and subtracting the offset from the predicted value to obtain the actual coordinate.

Preferably, the method includes rendering and/or storing the mesh.

Preferably, arranging the vertices in the consecutive order includes arranging the vertices such that most triangles in the mesh are defined by sub-groups of three vertices, including two consecutive vertices in the order and one preceding vertex which precedes the two consecutive vertices in the order.

There is further provided in accordance with a preferred embodiment of the present invention, a method for decompressing a compressed stream of signals into a mesh having a plurality of vertices having geometric coordinates, including extracting a coordinate list from the stream, representing the coordinates of the vertices in a consecutive order, extracting from the coordinate list at least one value representing an offset from an actual coordinate of one of the vertices to a predicted coordinate thereof, calculating the predicted value of the vertex coordinate, and subtracting the offset from the predicted value to obtain the actual coordinate, and providing the mesh responsive to the coordinate.

Preferably, the predicted value is calculated based on the coordinates of at least three preceding vertices in the consecutive order.

Alternatively or additionally, the predicted value is calculated based on topology information relating to a plurality of the vertices in the mesh.

Preferably, the predicted value is calculated by calculating coordinates of a point which forms a parallelogram together with an adjacent triangle.

Further preferably, the predicted value is calculated by calculating an estimated crease angle between an adjacent triangle and a triangle including the point.

Preferably, calculating the estimated crease angle includes determining a crease angle between adjacent planes which include pairs of neighboring triangles.

Preferably, calculating the estimated crease angle includes finding at least one pair of triangles which has a common edge closest to parallelism with an edge about which the crease angle is estimated.

Preferably, the at least one pair of triangles includes at least two pairs of triangles which have respective crease angles therebetween, and the estimated crease angle includes an average of the crease angles of the at least two pairs of triangles.

Preferably, decompressing the coordinates includes decoding the coordinate list using a codebook.

Preferably, the method includes displaying the mesh on a display, rendering the mesh and/or storing the mesh.

There is further provided in accordance with a preferred embodiment of the present invention, apparatus for compressing a mesh having a plurality of vertices, each vertex characterized by a degree equal to the number of edges incident thereon, including a compression processor, which receives the mesh and orders the vertices therein in a consecutive order and generates a topology list including the degrees of the vertices in the consecutive order, and which outputs a coded stream of signals including the topology list.

Preferably, the compression processor arranges the vertices in at least one sub-list in which the vertices are ordered along a contour of the mesh.

Preferably, the contour has a generally spiral shape.

Preferably, the at least one sub-list includes a number of sub-lists, the number determined according to a characteristic of the mesh.

Preferably, the processor inserts into the topology list an indication of the vertices at which two of the number of sub-lists meet.

Preferably, the processor orders the vertices such that a topology of the mesh may be regenerated using substantially only the topology list.

Preferably, the processor checks whether the mesh has an open boundary and adds a dummy vertex which is connected to vertices on the open boundary, if the mesh has an open boundary.

Preferably, the processor compresses the topology list.

Preferably, the processor applies an entropy coding algorithm to compress the topology list.

Preferably, the processor applies a Huffman algorithm to compress the topology list.

Preferably, the processor applies the entropy coding algorithm using a compression table generated according to a general frequency count.

Preferably, the processor applies the entropy coding algorithm using a compression table generated according to a frequency count of the degrees in the topology list.

Preferably, the processor compresses geometric coordinates of the vertices so as to generate a coordinate list, and wherein the stream of signals includes the coordinate list.

Preferably, the processor compresses the coordinates by representing the coordinates of at least some of the vertices as an offset from a predicted value.

Preferably, the processor calculates the predicted value based on coordinates of a plurality of preceding vertices in the consecutive order.

There is further provided in accordance with a preferred embodiment of the present invention, apparatus for compressing a mesh including a plurality of vertices having geometric coordinates, including a compression processor which arranges the vertices in a consecutive order and compresses the coordinates so as to generate a compressed coordinate list in which the coordinates of at least some of the vertices are represented as an offset from a predicted value, which is calculated based on the coordinates of a plurality of the preceding coordinates in the consecutive order, and which outputs a compressed stream of signals including the coordinate list.

Preferably, the processor calculates the predicted value based on the coordinates of at least three preceding vertices.

Preferably, the processor calculates the predicted value based on topology information relating to at least some of the vertices in the mesh.

Preferably, the processor calculates the predicted value by calculating coordinates of a point which forms a parallelogram together with an adjacent triangle.

Alternatively or additionally, the processor calculates the predicted value by calculating an estimated crease angle between an adjacent triangle and a triangle including the point.

Preferably, the processor calculates the estimated crease angle by determining a crease angle between adjacent planes which include pairs of neighboring triangles.

Further preferably, the processor calculates the estimated crease angle by finding at least one pair of triangles which has a common edge closest to parallelism with an edge about which the crease angle is estimated.

Preferably, the at least one pair of triangles includes at least two pairs of triangles which have respective crease angles therebetween, and the estimated crease angle includes an average of the crease angles of the at least two pairs of triangles.

Preferably, the processor represents the offsets using a codebook.

Preferably, the apparatus includes a memory in which the stream of signals is stored.

Preferably, the processor transfers the stream of signals over a network.

There is further provided in accordance with a preferred embodiment of the present invention, apparatus for decoding a stream of signals into a mesh including a plurality of vertices, each vertex characterized by a degree equal to the number of edges incident thereon, including a decompression processor which extracts a topology list, including a series of numbers representing the degrees of the vertices in a consecutive order, from the stream, and which generates and renders the mesh with the vertices having the degrees in accordance with the topology list.

Preferably, the processor extracts at least one sub-list in which the degrees of the vertices are ordered along a predetermined contour of the mesh.

Preferably, the predetermined contour has a generally spiral shape.

Preferably, the at least one sub-list includes a plurality of sub-lists, and wherein the processor extracts an indication of the vertices at which two or more of the sub-lists meet.

Preferably, the processor identifies dummy vertices and removes them from the mesh.

Preferably, the stream of signals includes compressed data, and wherein the processor decompresses the data to determine the series of numbers representing the degrees.

Preferably, the processor decompresses the data using an entropy algorithm.

Preferably, the processor decompresses the data using a compression table according to a general frequency count.

Preferably, the processor extracts a coordinate list representing geometric coordinates of the vertices from the stream and decompresses the coordinate list.

Preferably, the processor extracts from the coordinate list at least one value representing an offset between an actual coordinate and a predicted coordinate.

Preferably, the processor calculates the predicted coordinate for at least one vertex corresponding to the at least one value representing the offset, and subtracts the offset from the predicted coordinate to obtain the actual coordinate.

There is further provided in accordance with a preferred embodiment of the present invention, apparatus for decompressing a compressed stream of signals into a mesh having a plurality of vertices having geometric coordinates, including a decompression processor, which extracts a coordinate list from the stream representing the coordinates of the vertices in a consecutive order, extracts from the coordinate list at least one value representing an offset from an actual coordinate of one of the vertices to a predicted coordinate thereof, calculates the predicted value of the vertex coordinate and subtracts the offset from the predicted value to obtain the actual coordinate, and renders the mesh responsive to the coordinate.

Preferably, the processor calculates the predicted value based on the coordinates of at least three preceding vertices in the consecutive order.

Alternatively or additionally, the processor calculates the predicted value based on topology information relating to a plurality of the vertices in the mesh.

Preferably, the processor calculates the predicted value by calculating coordinates of a point which forms a parallelogram together with an adjacent triangle.

Preferably, the processor calculates the predicted value by calculating an estimated crease angle between an adjacent triangle and a triangle including the point.

Preferably, the processor calculates the estimated crease angle by determining a crease angle between adjacent planes which include pairs of neighboring triangles.

Preferably, the processor decompresses the coordinate list using a codebook.

Preferably, the apparatus includes a display to which the processor renders the mesh.

Preferably, the consecutive order includes an order such that most of the sub-groups formed of three consecutive vertices in the order define respective triangles in the mesh.

There is further provided in accordance with a preferred embodiment of the present invention, a method for representing a triangle mesh having a plurality of vertices which form triangles, including arranging substantially all of the vertices in a consecutive order such that most triangles in the mesh are defined by sub-groups of three vertices, including two consecutive vertices in the order and one preceding vertex which precedes the two consecutive vertices in the order, generating a list representing the vertices in the consecutive order and outputting the list.

Preferably, outputting the list includes rendering the mesh.

There is further provided in accordance with a preferred embodiment of the present invention, a method for compressing information regarding a vector associated with a vertex of a triangle mesh, including calculating a prediction of the vector based on a plurality of normals to triangles including the vertex, and indicating a difference between the prediction and the vector.

Preferably, indicating the difference includes indicating a first angle between the vector and the prediction and a second angle which comprises an angle of rotation of the vector around the prediction.

Preferably, indicating the first and second angles includes indicating indices of quantized values of the angles.

Preferably, indicating the first angle comprises quantizing the first angle in fixed quantization intervals and indicating the second angle includes quantizing the second angle in quantization intervals which vary with the sine of the first angle as quantized.

Preferably, the first and second angles are indicated by referring to a point on a unit sphere.

Preferably, the first and second angles are indicated by a single index.

Preferably, the vector comprises a normal to a surface containing the vertex.

The present invention will be more fully understood from the following detailed description of the preferred embodiments thereof, taken together with the drawings, in which:

BRIEF DESCRIPTION OF THE DRAWINGS

FIGS. 9A and 9B are a flow chart illustrating operations performed in generating a topology list indicative of the topology of a mesh, in accordance with a preferred embodiment of the present invention;

DETAILED DESCRIPTION OF PREFERRED EMBODIMENTS

Figure 1:
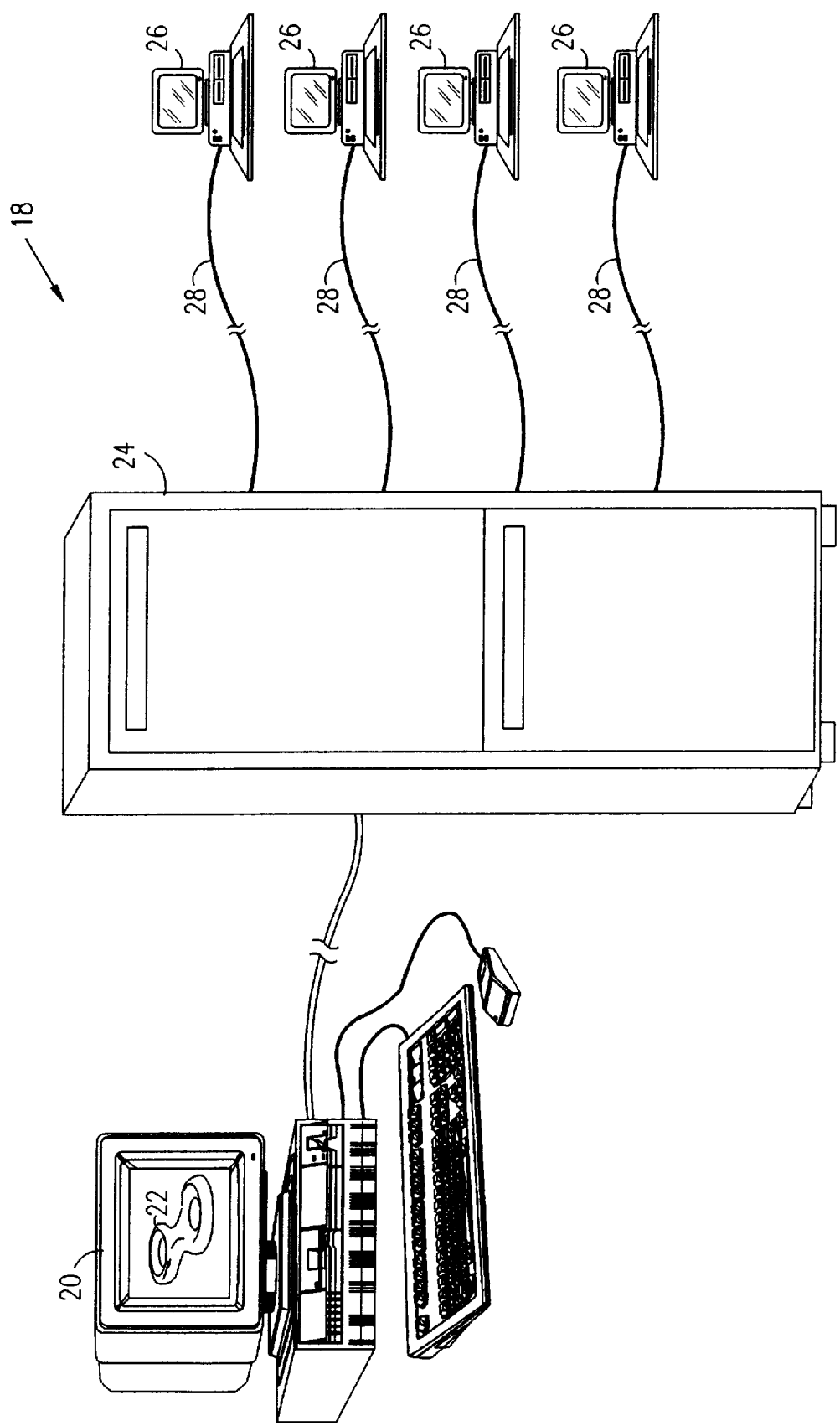
FIG. 1 is schematic illustration showing transmission of a compressed three-dimensional graphic object from a sending computer to a receiving computer, in accordance with a preferred embodiment of the present invention.

FIG. 1 is a schematic illustration of a system 18 for transmission of a three-dimensional mesh object 22 from a server 24 to one or more receiving computers 26, in accordance with a preferred embodiment of the present invention. Server 24 is preferably an Internet server, although any computer including a personal computer may be used. Object 22 is generated using any method known in the art, either in server 24 or at a separate work station 20 which is directly or indirectly connected to server 24. Object 22 is preferably generated in accordance with the VRML standard or is translated into the VRML standard, using computer programs known in the art, either in computer 20 or server 24. Object 22 is then compressed using a software program in accordance with the principles of the present invention, as described below. The compression is preferably performed by a compression processor in server 24, or in work station 20, which may be either a general-purpose computer processor or a dedicated graphics processor. The compressed form of object 22, which ordinarily comprises a compressed stream of signals, is transmitted from server 24 over a network to one or more receiving computers 26 where it may be decompressed, using compatible software, displayed and/or stored. Preferably, receiving computer 26 comprises a decompression processor which decompresses object 22.

Figure 2:
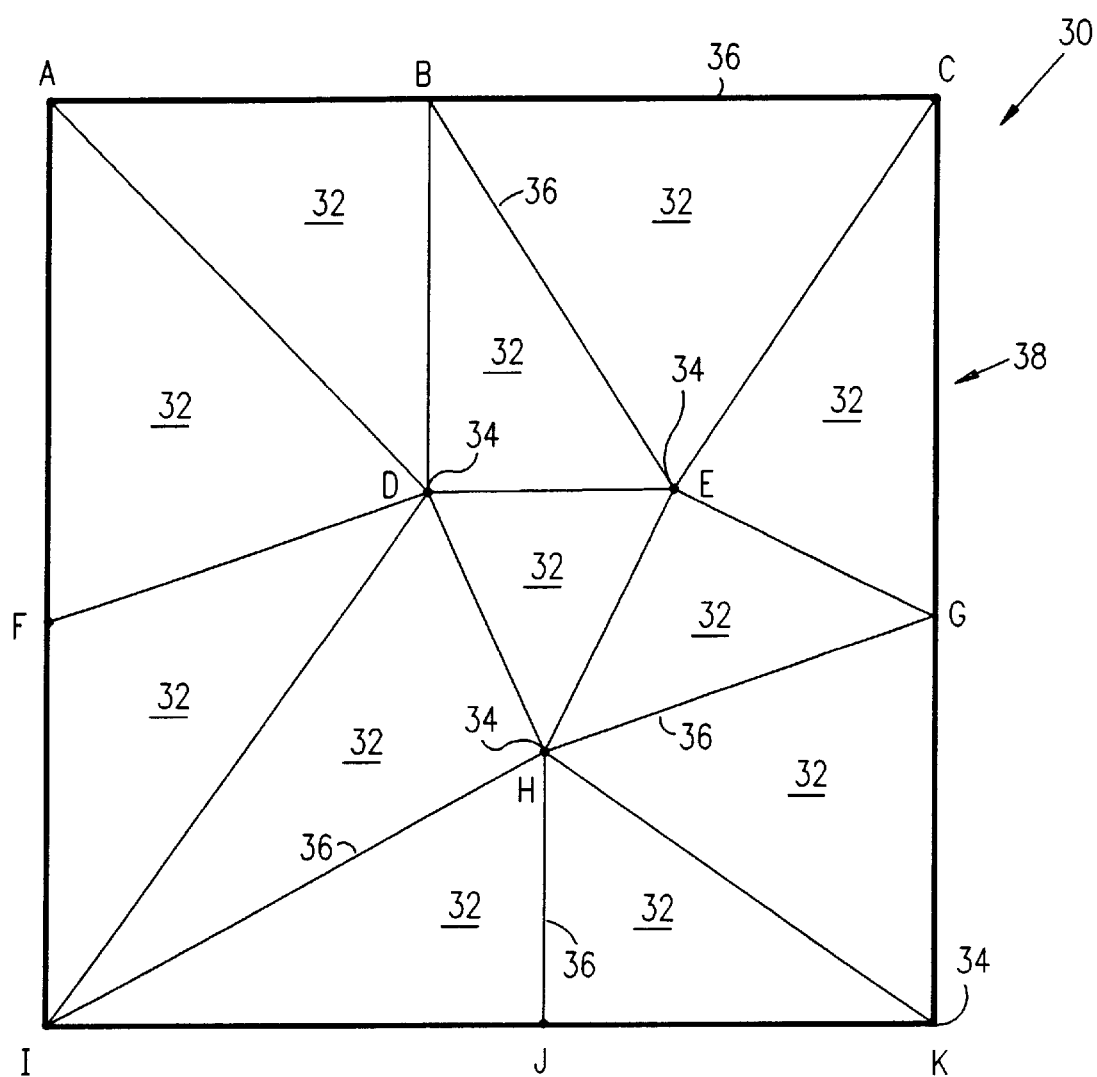
FIG. 2 is a simple triangle manifold mesh, useful in understanding a method of compression in accordance with a preferred embodiment of the present invention.

FIG. 2 illustrates a simple triangle manifold mesh 30, on which the method used to compress object 22 is hereinbelow demonstrated, in a simplified form. Mesh 30 comprises a plurality of triangles 32, which are defined by their vertices 34, indicated by letters A–K. Edges 36 connect vertices 34 and form triangles 32. A non-compressed representation of mesh 30 in arbitrary coordinates may be as in table 1.

TABLE 1

| |
|---|
| IJH: (0,0,0), (8,0,0), (8,4,0) |
| KHJ: (14,0,0), (8,4,0), (8,0,0) |
| KGH: (14,0,0), (14,6,0), (8,4,0) |
| EHG: (10,8,0), (8,4,0), (14,6,0) |
| EGC: (10,8,0), (14,6,0), (14,14,0) |
| ECB: (10,8,0), (14,14,0), (6,14,0) |
| EBD: (10,8,0), (6,14,0), (6,8,0) |
| ADB: (0,14,0), (6,8,0), (6,14,0) |
| AFD: (0,14,0), (0,6,0), (6,8,0) |
| IDF: (0,0,0), (6,8,0), (0,6,0) |
| IHD: (0,0,0), (8,4,0), (6,8,0) |
| EDH: (10,8,0), (6,8,0), (8,4,0) |

Figure 3:
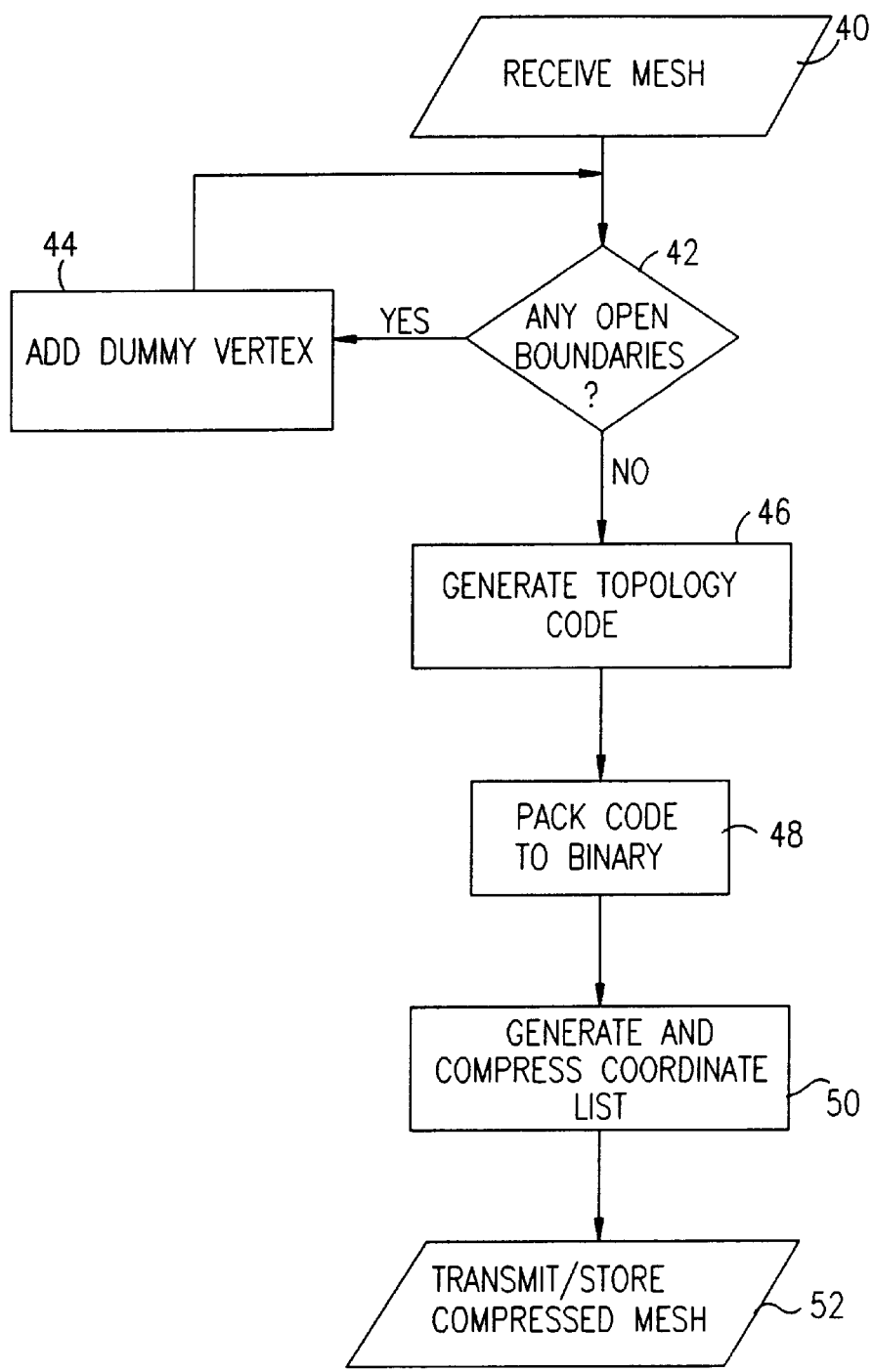
FIG. 3 is a flow chart illustrating a compression procedure, in accordance with a preferred embodiment of the present invention.

FIG. 3 is a flow chart illustrating a compression procedure, in accordance with a preferred embodiment of the present invention. As indicated in blocks 42 and 44, the compression procedure begins with transforming mesh 30 to a closed surface which has no boundaries. Preferably, if an open boundary exists it is canceled by adding a dummy vertex which is connected to all the vertices on the boundary. Thereafter, a topology list (TL), which represents the topology of the mesh, is generated, as indicated in block 46 of FIG. 3. The topology list (TL) is packed to binary form, as indicated in block 48. A coordinate list (CL) corresponding to the topology list (TL) is also generated and compressed, as indicated in block 50. The operations in blocks 46, 48 and 50 may be performed either consecutively or in parallel. These operations are described in detail below. After these steps are completed, the mesh is transmitted and/or stored in compressed form, as indicated in block 52.

Figure 4:
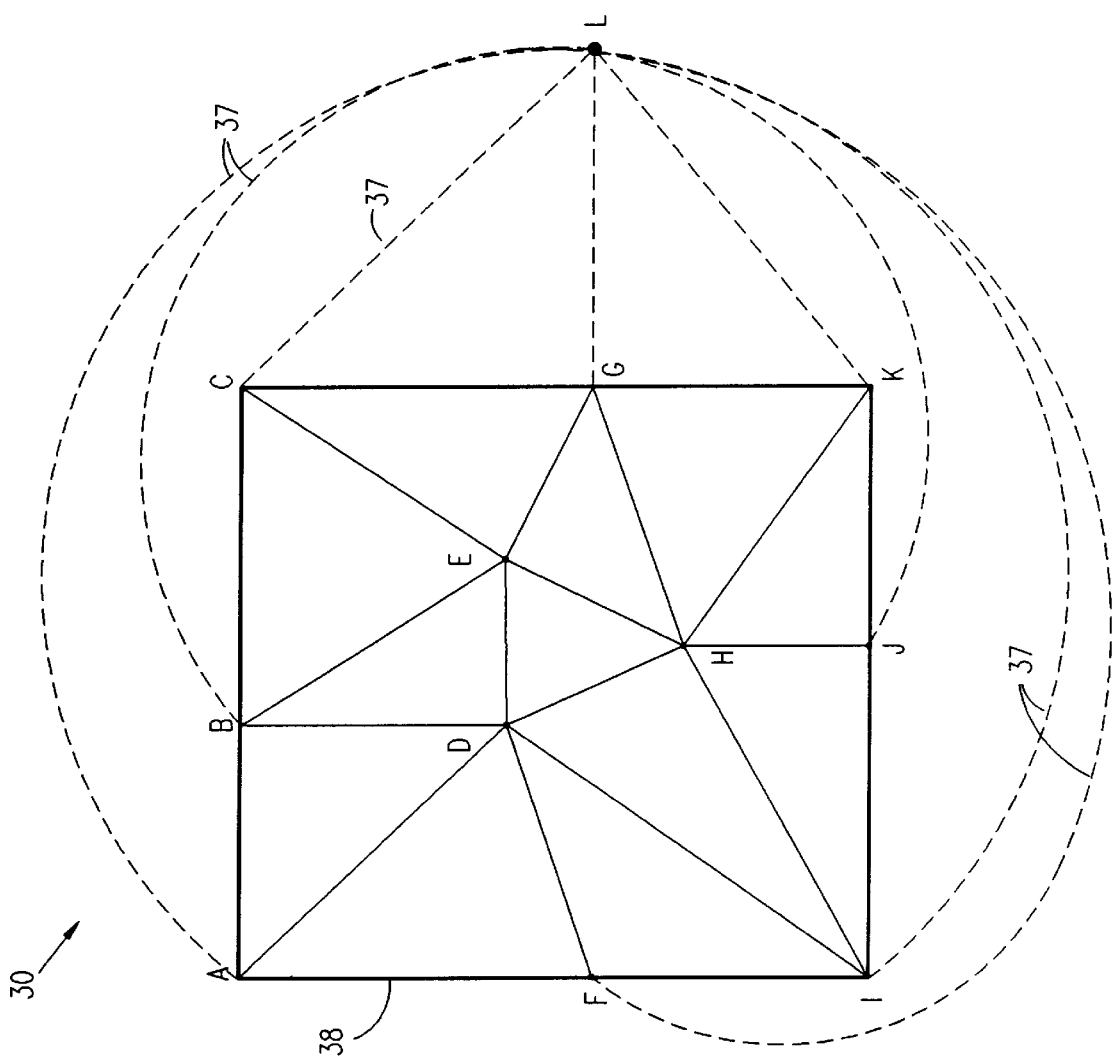
FIG. 4 shows the mesh of FIG. 2 with the addition of a dummy vertex, in accordance with a preferred embodiment of the present invention.

FIG. 4 illustrates the addition of a dummy vertex to mesh 30, in accordance with a preferred embodiment of the present invention. Since mesh 30 has an open boundary 38, a dummy vertex (L) is added to mesh 30 and is connected to vertices (A,B,C,F,G,I,J,K) which are on boundary 38. Dummy edges 37 connect dummy vertex L to boundary 38.

Figure 5:
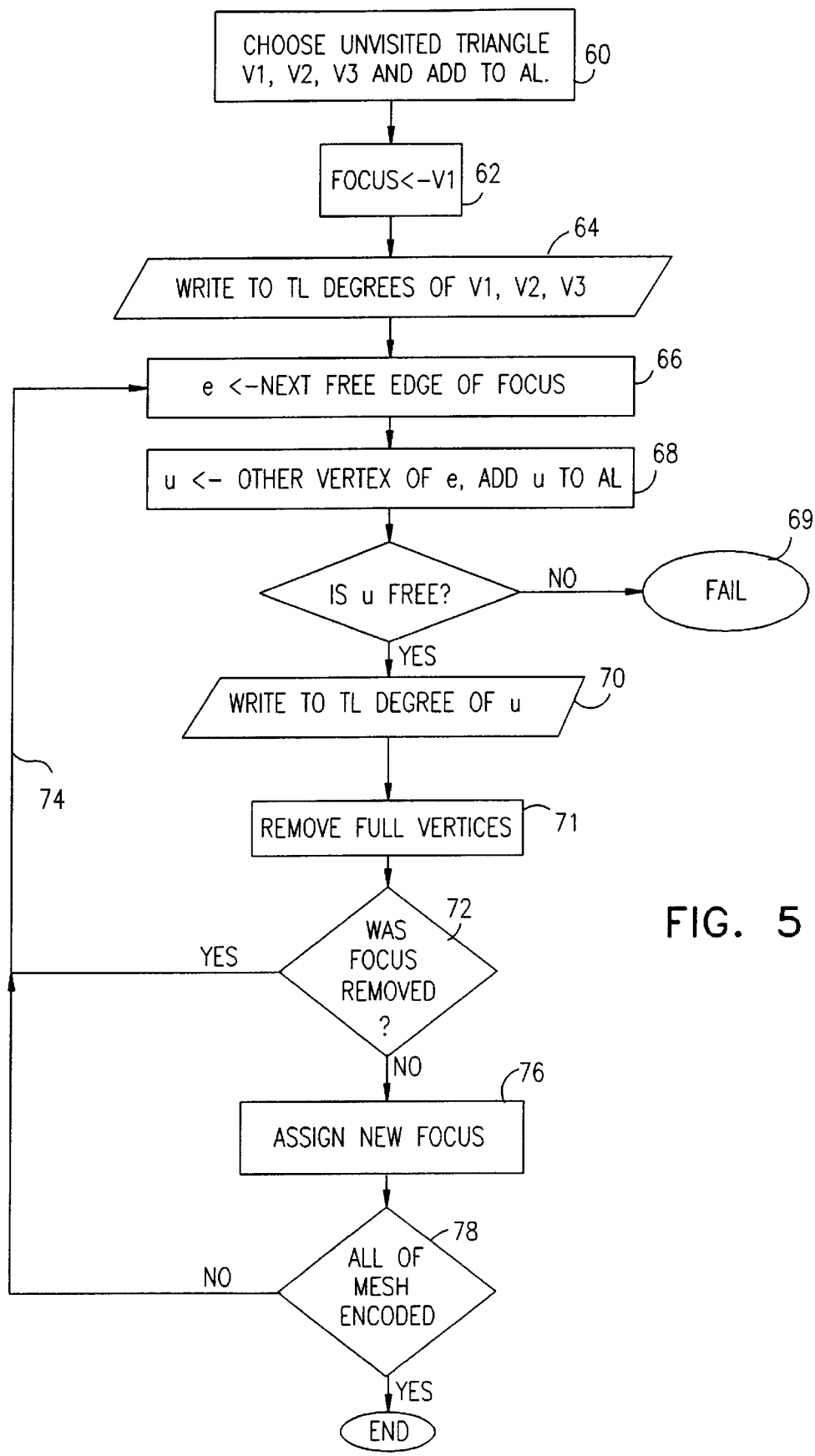
FIG. 5 is a flow chart illustrating operations performed in generating a topology list representing the topology of a simple mesh, in accordance with a preferred embodiment of the present invention.

FIG. 5 is a flow chart showing operations performed in generating the topology list (TL) representing the topology of mesh 30, in accordance with a preferred embodiment of the present invention. The flow chart of FIG. 5 shows a simplified algorithm for explanatory purposes only, and the algorithm is described in greater detail below with reference to FIGS. 9A and 9B. Reference is also made to FIGS. 6A–6F which illustrate a step-by-step example of the method of the flow chart of FIG. 5, as performed on mesh 30.

Figure 6A:
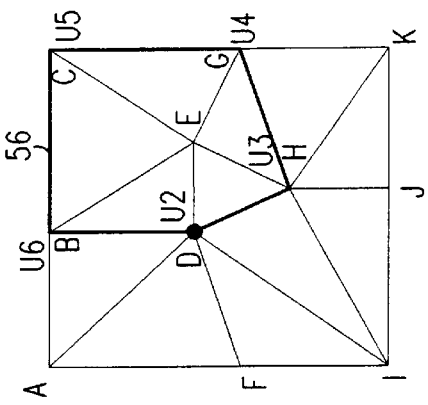
FIGS. 6A–6F illustrate the mesh of FIG. 2 at various stages of performing the method of the flow chart of FIG. 5.
Figure 6B:
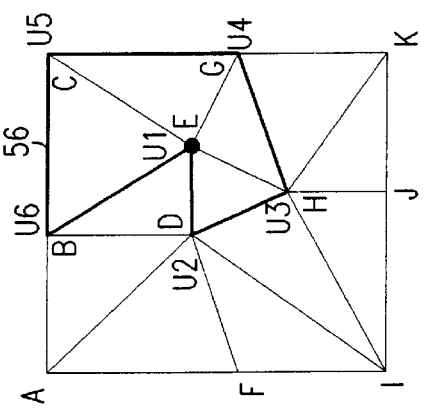

In block 60 of FIG. 5, a beginning triangle 58 is chosen, as shown in FIG. 6A, and its vertices (D,E,H) are entered, preferably in a counter-clockwise order, into a list of vertices and edges currently being processed, referred to as an active-list (AL), represented schematically by a thick line 56 in FIGS. 6A–6F. Triangle 58 is chosen arbitrarily, or alternatively may be chosen in a manner which enhances the compression ratio. Active list 56 corresponds to a vertex cycle in the mesh comprising vertices and edges which form a closed line. Active list 56 partitions the mesh into an outer part containing edges not yet encoded (or traversed) and an inner part containing edges already encoded (or traversed). The vertices in the mesh are numbered in the order in which they enter the topology list. The vertices in the active list are preferably correspondingly ordered, and the outer part of the mesh relative to the active list is defined as the part to the right, as one proceeds along the active list in an ascending, or counter-clockwise, manner (or alternatively to the left, if one proceeds clockwise).

The edges of chosen triangle 58 are indicated as traversed, and one of the vertices, E, preferably the first vertex in the active list, is chosen to be a focus, indicated in FIGS. 6A–6F by a large dot, the purpose of which is explained below. As indicated in block 64, the degrees, i.e., the number of edges incident on a vertex, of the vertices of the triangle are added to the topology list, which thus includes a condensed representation of the topology of mesh 30. In FIGS. 6A–6F, the order in which the vertices are encoded in the topology list is indicated by Un, in which n is a running index. The resulting topology list at this stage is [5,6,6], representing the degrees of vertices E, D, and H, respectively.

As indicated in block 66, the current focus is processed by choosing from the edges incident on the focus a free edge (e), i.e., an edge not previously marked as traversed. It is noted that since the focus is part of the active list, it already has two edges which are on the active list. The edges outside the active list can, therefore, be ordered in a clockwise or counter clockwise order. Preferably, the free edge is chosen in counter-clockwise order from the edges which are outside the active list. In most cases the chosen edge is incident on a free vertex, i.e., a vertex not already marked as visited, and that vertex is added to active list 56, as indicated in block 68, and is marked as visited. However, if the chosen edge is not free, the mesh cannot be encoded by the simplified method illustrated in FIG. 5 and the process fails, as indicated in block 69. Such meshes may be encoded using the algorithm described hereinbelow in conjunction with FIGS. 9A and 9B. In FIG. 6A the next counter-clockwise edge from focus E is edge GE. Edge GE connects to vertex G, which is added to active list 56 together with edges connecting vertex G to active list 56, i.e., GE and GH, replacing edge EH. All edges added to active list 56 are also indicated as traversed.

This process is repeated as indicated by arrow 74 until all the free edges incident on the focus are traversed. In FIG. 6A, edge EC is the next chosen edge, and vertex C and edges GC and EC are added to the active list and replace edge EG. Thereafter, edge EB is traversed and vertex B is added to the active list together with edges EB and BC which replace edge EC. At this point, shown in FIG. 6B, no more untraversed edges are incident on focus E and therefore focus E is removed from the active list, as indicated in block 71. Edge BD is marked as traversed and replaces edges BE and DE in the active list, bringing active list 56 to the shape shown in FIG. 6C. The topology list at this point is [5, 6, 6, 5, 4, 5], corresponding to U1 through U6.

The next vertex on the active list, D, is now assigned as focus, and the process of choosing free edges is repeated. This process continues until all the vertices are added to active list 56. Preferably, each time any vertex on the active list becomes full, i.e., when all its incident edges have been traversed, the full vertex is removed from the active list. If the focus becomes full and is therefore removed, another vertex on the active list becomes the new focus. The new focus is chosen deterministically and consistently, such that both compression and decompression always choose the same new focus. Preferably, the vertex following the current focus on the active list becomes the new focus. The process ends when the active list is empty.

The removal of a full vertex u from the active list introduces to the active list a new edge that links the vertex preceding u in the active list with the vertex following u in the active list. This may cause another vertex in the active list to become full, and therefore to be removed from the active list. Thus, removal of a full vertex may cause a cascade of removals of vertices. This operation is initiated by the RemoveFullVertices( ) command in table 2, which is equivalent to block 71.

Figure 6C:
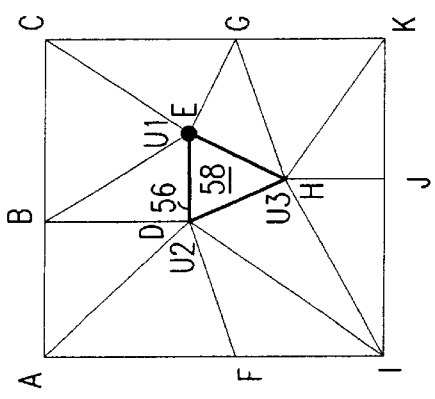
Figure 6D:
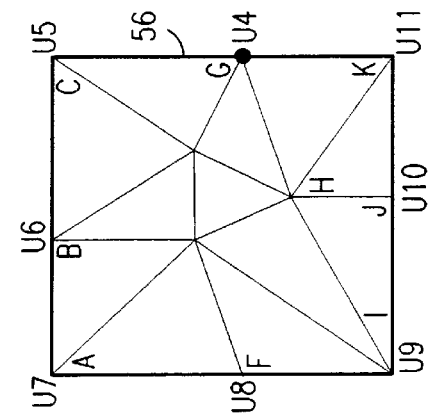
Figure 6E:
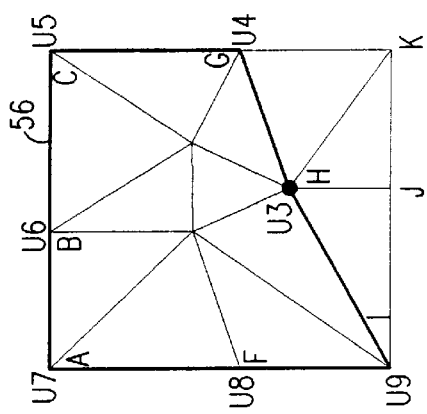
Figure 6F:
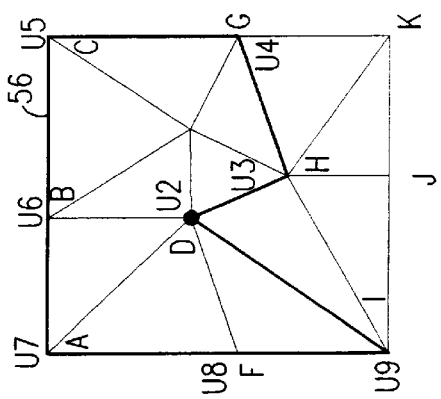

In FIG. 6C the first free edge incident on D is DA, which is traversed, bringing vertex A to be added to the active list. Thereafter, vertices F and I are added to the active list, arriving at the situation shown in FIG. 6D. At this point vertex D is removed from the active list and edge HI is marked as traversed, replacing DI and DH in the active list and bringing to the situation shown in FIG. 6E. It is noted that all the vertices and edges on, and in, the active list have been traversed while those out of the active list have not been traversed yet.

Vertex H is the next focus, and its free edges HJ and HK are traversed as described above. Vertex H is removed from the active list, bringing to the situation shown in FIG. 6F. At this point, vertex G, which is next on the active list, is assigned as focus. The only free edge incident on D is dummy edge GL, which connects G to dummy vertex L, as shown in FIG. 4. Vertex L is added to the active list together with edges GL and KL. Vertex G is removed from the active list, adding edge CL to the active list. The next vertex in the topology list, C, is full, so it is removed, adding edge BL to the active list. In the same way all the vertices are removed from the active list, ending the encoding procedure.

The resulting topology list, formed of the degrees of the vertices in the encoding order, is [5, 6, 6, 5, 4, 5, 4, 4, 5, 4, 4, 8]. Preferably, a command which indicates that the numbers on the list identify degrees of vertices is annexed to each number, so as to differentiate them from other possible commands described below. Further preferably, dummy vertices have a different command annexed to them. Thus, the topology list may be: [add 5, add 6, add 6, add 5, add 4, add 5, add 4, add 4, add 5, add 4, add 4, add dummy 8]. Preferably, the topology list is further compressed and packed as described hereinbelow.

Figure 7:
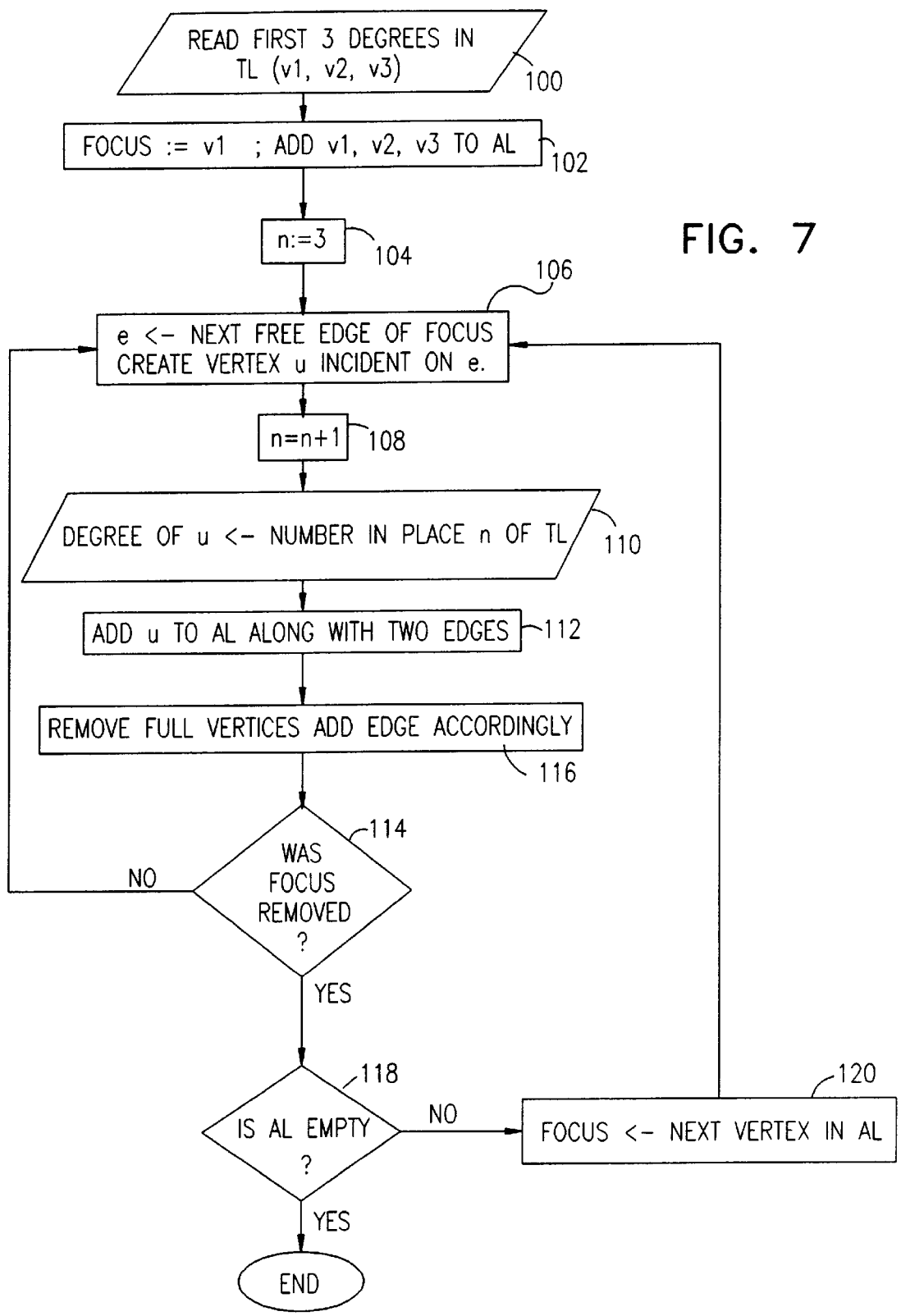
FIG. 7 is a flow chart illustrating a method of decoding a topology list to derive its generating mesh, in accordance with a preferred embodiment of the present invention.

Reference is now made to FIGS. 7 and 8A–8F. FIG. 7 is a flow chart illustrating a method of decoding a topology list to reconstruct its generating mesh, in accordance with a preferred embodiment of the present invention. The flow chart of FIG. 7 shows a simplified algorithm for explanatory purposes, and the algorithm is described in greater detail below with reference to FIG. 13. The method illustrated in this flow chart is only guaranteed to successfully decode those topology lists which were successfully encoded by the method illustrated in FIG. 5. FIGS. 8A–8F show the decoded mesh, step by step, in accordance with a preferred embodiment of the present invention. The decoding method is designed to be compatible with the encoding method.

Figure 8A:
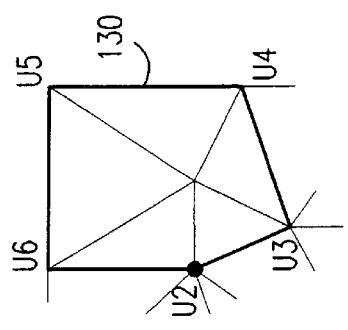
FIGS. 8A–8F show decoding of a list to generate a mesh, step by step, in accordance with a preferred embodiment of the present invention.

The first three numbers in the topology list are read and used as degrees to recreate v1, v2, v3, respectively, as indicated in block 100. These numbers represent the respective degrees of vertices used to generate a beginning triangular active list. In FIG. 8A such vertices are designated (U1, U2, U3). As indicated in block 102, the first vertex is assigned to be the focus. The generated active list is shown by a bold line 130 in FIG. 8A, together with indication of edges incident on the vertices of the active list. The number of edges is determined according to the degrees of the vertices from the topology list (TL). It is noted that the decoding process described herein is limited to generating the topology of the mesh, while the geometric coordinates of the vertices in the mesh are determined separately, from the coordinate list, as described below. Alternatively, the coordinate list may be used concurrently with decoding of the topology list.

Figure 8B:
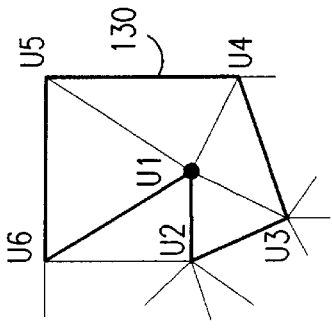
Figure 8C:
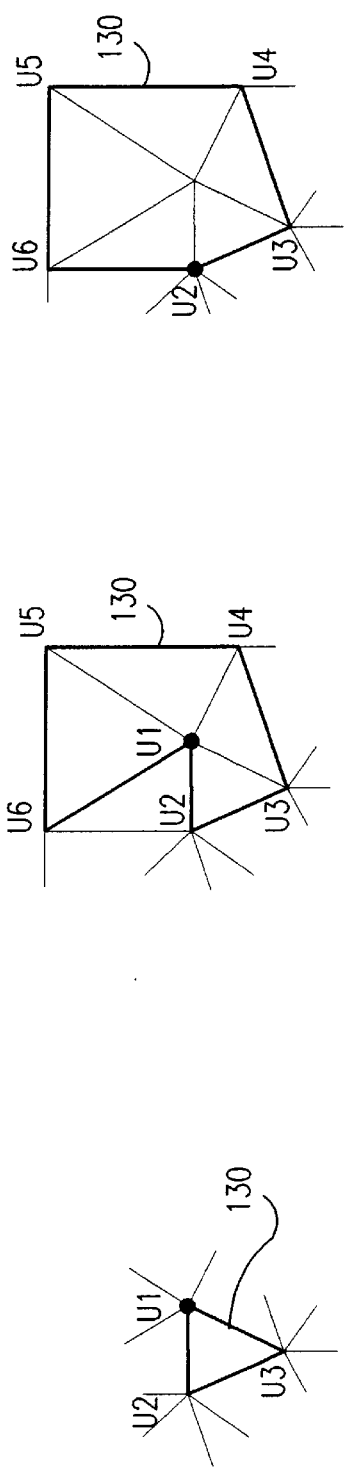
Figure 8D:
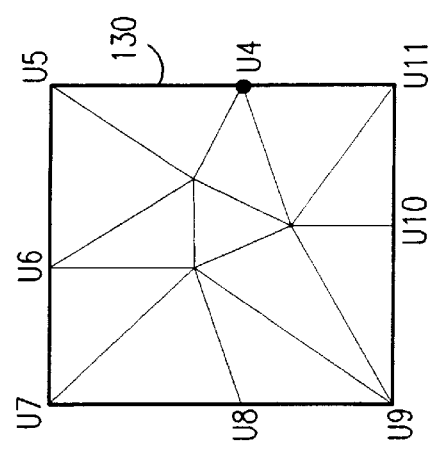
Figure 8E:
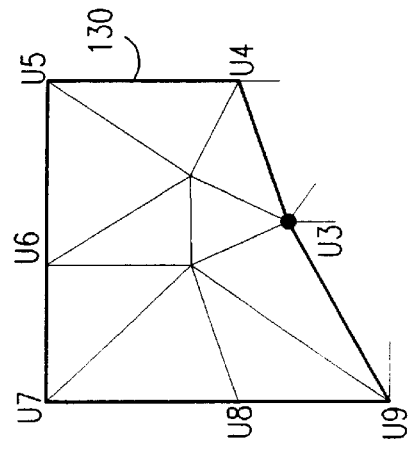
Figure 8F:
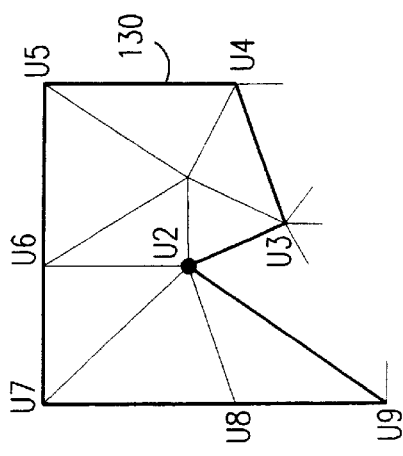

As is shown in FIG. 8A, focus U1 has three free edges which together with edges (U1,U2) and (U1,U3), comprise the five edges incident on vertex U1, as indicated in the topology list. As shown in blocks 106–112, each of these edges, in a counter-clockwise order, is used to generate a vertex with a degree indicated by the next number in the topology list. As shown in FIG. 8B, with vertex U1 taken as the focus, vertices U4, U5, and U6 are added to the active list. Thereafter, focus U1 is full and is removed from the active list, as indicated in block 116, and an edge connecting the first of the remaining vertices (U2) and last vertex (U6) is added to the active list. Vertex U1 is removed from the active list and edge (U2,U6) replaces edges (U1,U2) and (U1,U6). Vertex U2 is then assigned as the focus, as indicated in block 120, and the process of adding edges is repeated until the active list is empty.

Figure 9A:
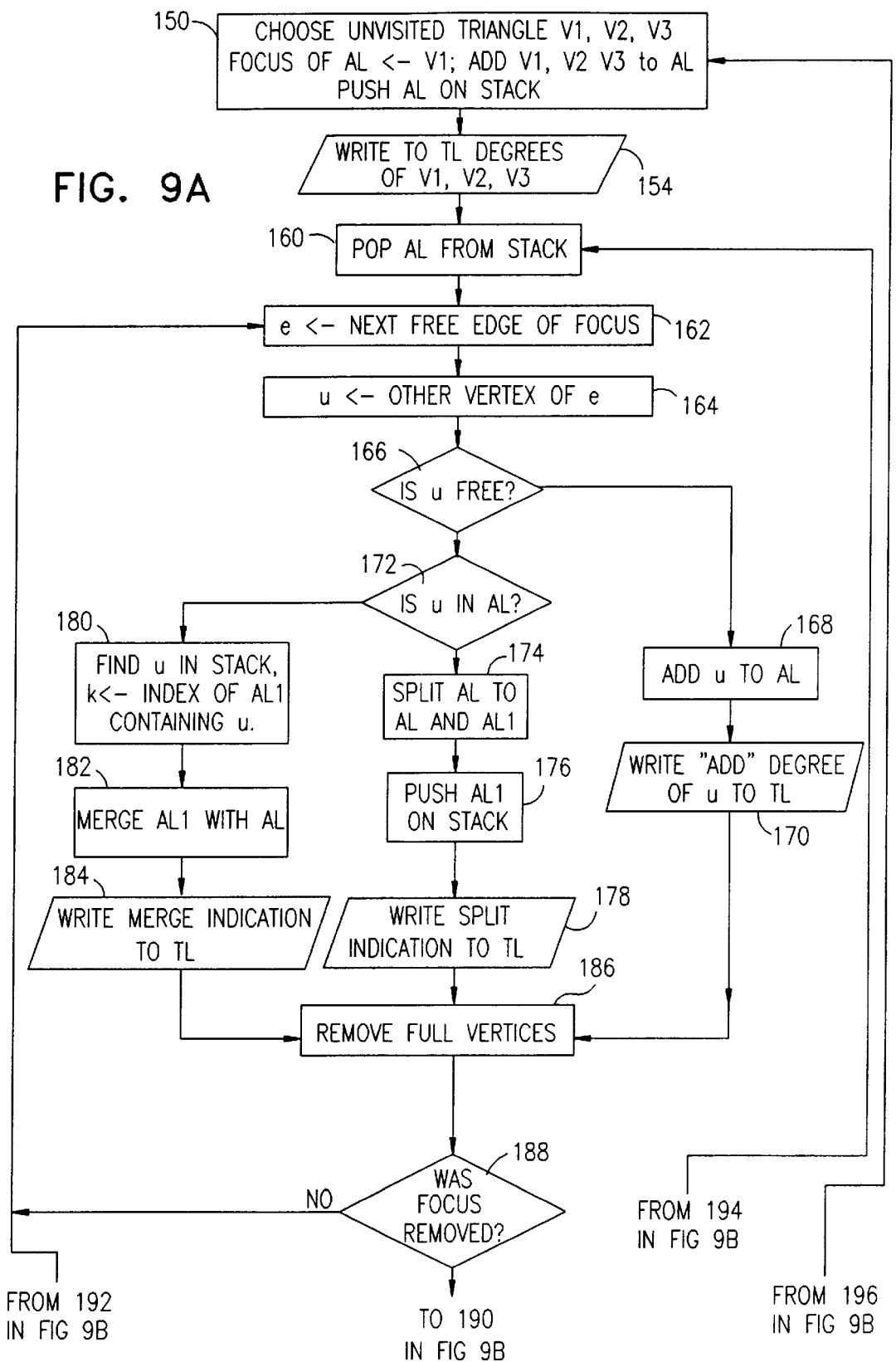

FIGS. 9A and 9B are a flow chart showing the operations performed in generating a topology list indicative of the topology of a mesh, in accordance with a preferred embodiment of the present invention. These operations are also indicated by the pseudo-code in table 2.

TABLE 2

```
Procedure EncodeConnectivity (Tmesh M)
{
    Stack S;    // Stack of active lists
    ActiveList AL, AL1;
    while not all triangles of M visited { // catch all connected components
        pick an unvisited triangle (v1,v2,v3) of M;
        AL.Add(vl,v2,v3);
        output ("add %d",v1.degree);
        output ("add %d",v2.degree);
        output ("add %d",v3.degree);
        AL.focus := vl;
        S.Push(AL);
        while not S.Empty() {
            AL := S.Pop();
            while not AL.Empty() {
                e := AL.focus.FreeEdge(); // next free edge in clockwise order
                u := AL.focus.Neighbor(e); //neighboring vertex along edge e
```

TABLE 2-continued

```
            if u.Free() {
               AL.Add(u); // this is always possible
               output ("add %d", u.degree)
            } else
            if AL.Isin(u) {
               (AL,AL1) := AL.Split(e); //split AL to AL and AL1 at edge e, inherit focus
               S.Push(AL1);
               output ("split %d", offset from AL.focus to u)
            } else {
               AL1 := S.Isin(u); // u is already in some AL on the stack - find it
               k := S.Pop(AL1); // k is index of AL1 on stack
               AL.Merge(AL1,u); // merge AL1 with AL at u
               output ("merge %d %d", k, offset from AL.focus to u)
            }
            AL.RemoveFullVertices();
            if AL.focus.Full()
                  AL.focus := AL.focus.NextNeighbor();
         }
      }
   }
}
```

As indicated in block 150, an unvisited triangle, i.e., a triangle all of whose vertices and edges have not been traversed, is chosen. Preferably, the triangle is chosen so as to minimize the size of the compressed mesh. Preferably, the triangle is chosen according to characteristics of the topology of the mesh, and/or according to test compressions performed on various triangles. One of the vertices of the chosen triangle, which is preferably chosen in a similar manner, is assigned as the focus.

As indicated in blocks 150 and 154, the vertices of the triangle are added to the active list and their degrees are output to the topology list together with an "add" command. The "add" command indicates that the degree is added to the topology list, and no special actions are taken. The active list is then pushed onto a stack, or queue, in preparation for block 160 in which an active list is removed from the stack. It is noted that in certain meshes which have a complex topology, the active list may be split into a number of active lists, which are preferably processed sequentially. Therefore, the stack is used to save additional active lists created during processing, until they are processed. In these meshes the topology list comprises a number of sub-lists, each of which is generated by a respective one of the active lists.

As indicated in blocks 162 and 192, each active list in the stack is removed in turn, and the vertices of the active list are processed until the active list is empty. Processing of the vertices begins with the focus, for which all the free edges are processed sequentially. The first free edge, according to any ordering scheme, preferably a clockwise or counter-clockwise ordering scheme is chosen, as indicated in block 162. The symbol u is assigned to the vertex on the other side of the chosen edge, as indicated in block 164. The status of this edge is examined in blocks 166 and 172 in order to determine a proper course of action. If u is a free vertex, i.e., not yet traversed (encoded), u is added to the current active list together with the edges which connect the vertex to the active list. These edges are marked as traversed, and preferably any inner edges in the active list are removed from the list. The degree of u is output to the topology list together with the "add" command, as indicated in block 170. However, if the added vertex is a dummy vertex, the add command is replaced by an "add dummy" command indicating that the vertex is a dummy vertex.

If, however, u is already in the current active list, the active list is split into two along the edge which connects u to the focus, as indicated in block 174. The fact that u is already in the current active list indicates that a single winding path cannot cover the mesh in the vicinity of u, and therefore the active list is split into two, each active list generating a separate sub-list corresponding to a respective winding path.

Figure 10:
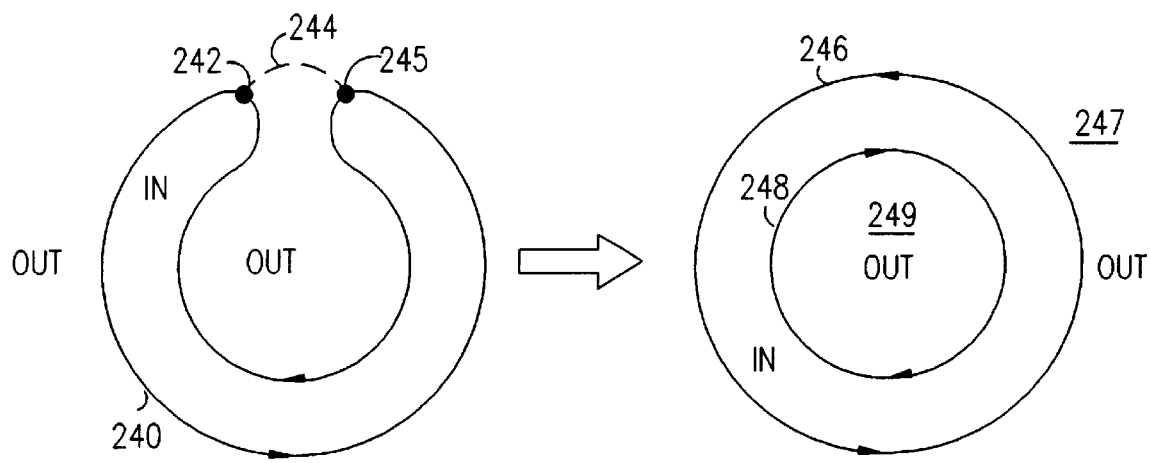
FIG. 10 is a graph which schematically illustrates a mesh in which an active list is split to two active lists, in accordance with a preferred embodiment of the present invention.

FIG. 10 is a graph which schematically illustrates an active list which is split into two active lists, in accordance with a preferred embodiment of the present invention. Active list 240 is generated and reaches a vertex 242 of which the next free edge 244 is incident on vertex 245 also belonging to active list 240. In order to continue properly, active list 240 is split into two active lists 246 and 248. Active list 246 surrounds active list 248, and the area between the active lists is inner to both the active lists and therefore has been encoded. Active list 248 continues outward into area 249, and active list 246 propagates outward to area 247.

Returning to FIG. 9A, preferably, active list AL is split to two active lists, a first active list AL which includes all, the vertices in the old active list from u up to the focus (inclusive), and a second active list AL1 which includes all the vertices in the old active list from the focus up to u (inclusive). It is noted that the active lists are directed and cyclic. Preferably, both AL and AL1 receive the focus from the old active list. Alternatively or additionally, since the focus of AL has no more free edges, it is removed from AL during the split, and the next vertex in AL is appointed focus. One of AL and AL1 is pushed onto the stack for later processing, as indicated by block 176, while the current processing continues with the other active list. It is noted that the order in which the vertices appear in the active list is preferably not altered, since this order defines which side of the active list is the inner side which was already processed and which is the outer side which is to be processed. Preferably, when progressing along the active list in an ascending, counter-clockwise direction, the side on the right is the outer side.

As indicated in block 178, a "split" command is output to the topology list together with an indication of where the split occurred. Preferably, the indication comprises an indication of the edge at which the split occurred. Further preferably, the indication comprises the number of free edges along the current active list from its focus to u. A specific example of such an indication is illustrated hereinbelow in FIG. 14I and described with reference thereto. Alternatively or additionally, the indication comprises the number of vertices between u and the focus in the old active list, and the number of free edges of u which are between the split edge and the edge connecting u to its preceding vertex in the active list.

If u is not free and is not in the current list, it is inevitably in an active list in the stack. This is possible when the object has a toroidal genus 1 topology, and indicates that two different active lists may progress in the same course. Therefore, the two active lists are merged into a single active list.

Figure 11:
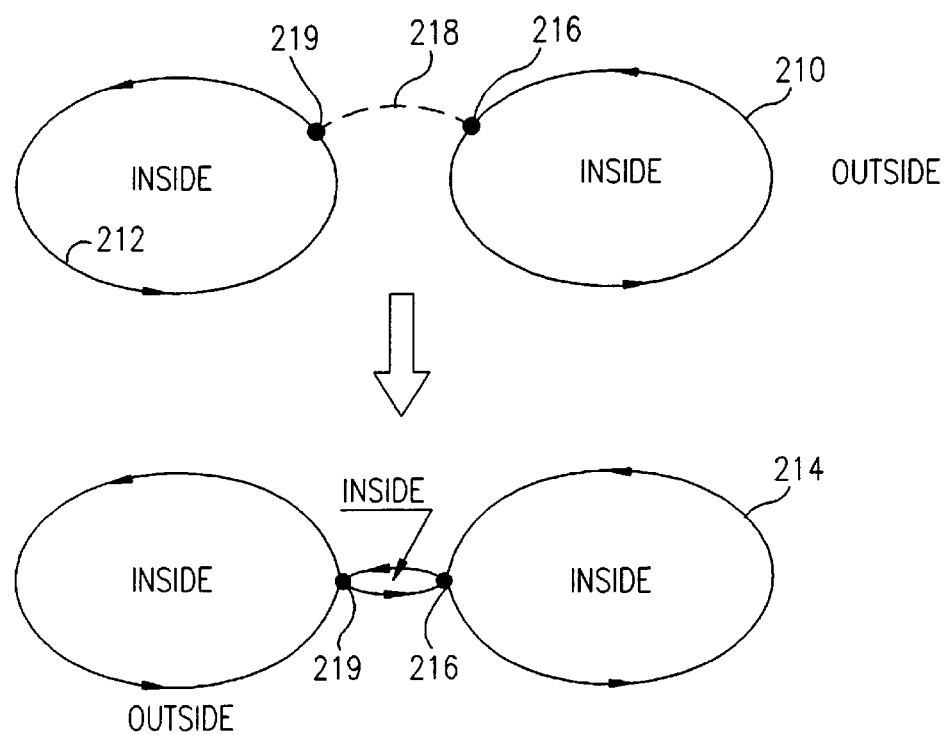
FIG. 11 is a graph which schematically illustrates a mesh in which two active lists are merged, in accordance with a preferred embodiment of the present invention.

FIG. 11 is a simplified graph which schematically illustrates two active lists which are merged, in accordance with a preferred embodiment of the present invention. Active list 212 is put on the stack for some reason, and at a later time active list 210 is generated. Active list 210 arrives at vertex 216, which has a next free edge 218, leading to a vertex 219 in active list 212. Therefore, active lists 210 and 212 meet and are merged together to become active list 214.

In this case, as indicated in block 180 in FIG. 9A, the active list AL1 which includes u is found in the stack, and a variable k is assigned as an index of AL1 on the stack, so as to indicate where the merge occurred. Preferably, k indicates how far AL1 is from the top of the stack or, alternatively, from the bottom of the stack. As indicated in block 182, AL1 is removed from the stack and is merged with the current active list. As indicated in block 184, a "merge" command is written to the topology list, along with k and an offset indicative of the free edge on vertex u at which active lists AL and AL1 are merged. Preferably, the offset is the number of free edges along AL1 from its focus to u.

Preferably, as indicated in block 186, after generating the appropriate command, each full vertex is removed from the active list. Edges may be added accordingly in order to maintain the connectivity of the active list. As indicated in block 188, free edges of the focus are traversed until the focus has no more free edges. When the free edges of the focus have all been traversed, the focus will have been removed, as indicated in block 186. The next vertex in the active list is then preferably chosen to be focus, as indicated in block 190.

As indicated in block 192, this process continues until the current active list is empty, and is then continued on the next active list which is retrieved from the stack. When the stack is empty a new unvisited triangle is chosen and processed until the entire mesh is encoded.

Figure 12A:
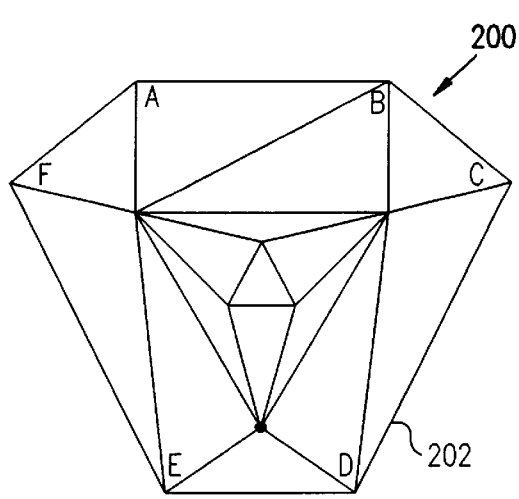
FIGS. 12A–12T show a step-by-step example of performing the method of FIGS. 9A and 9B on a mesh, in accordance with a preferred embodiment of the present invention.
Figure 12B:
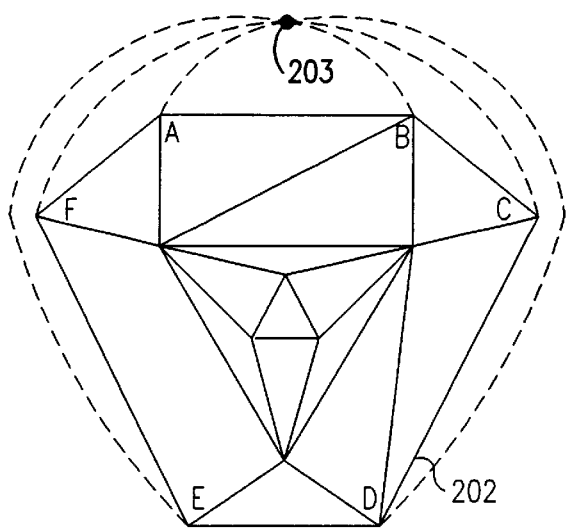
Figure 12C:
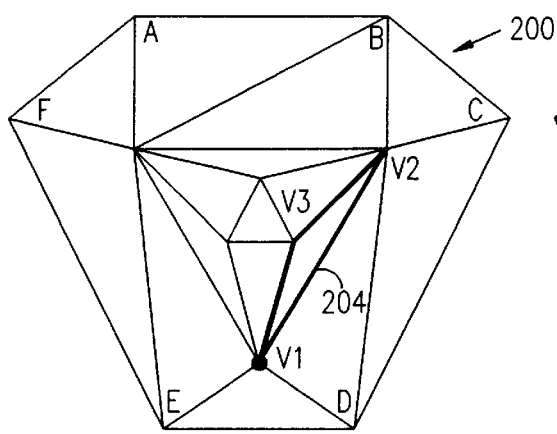
Figure 12D:
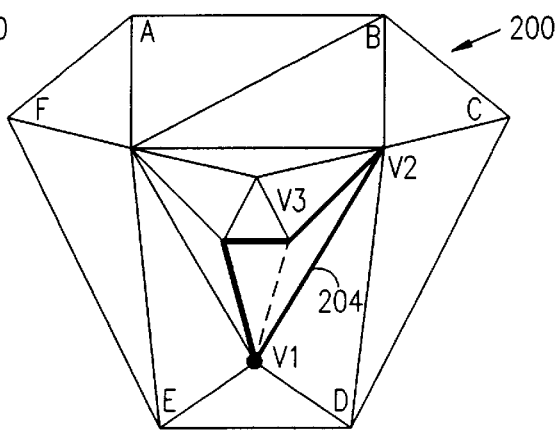
Figure 12E:
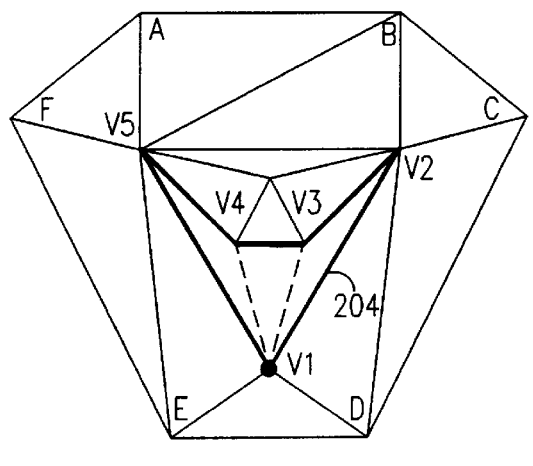
Figure 12F:
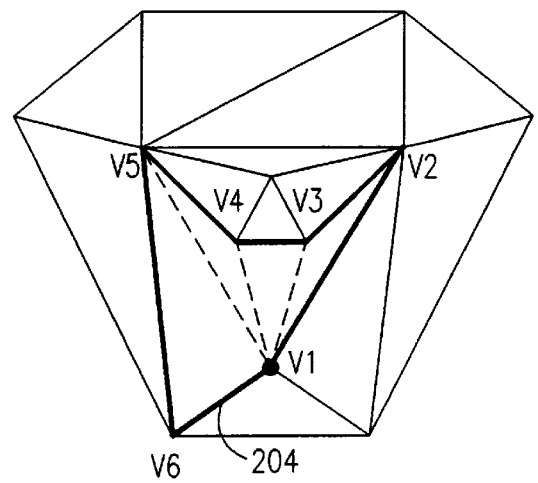
Figure 12G:
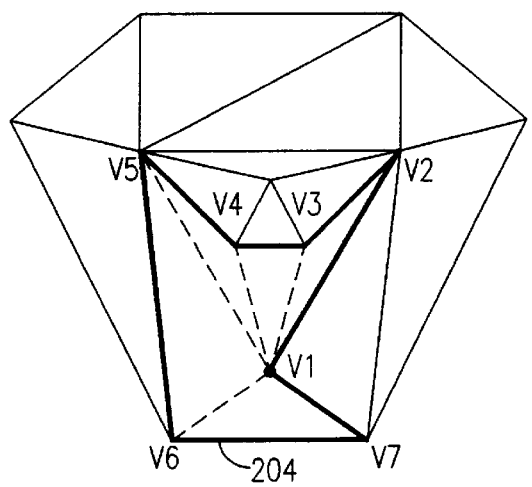
Figure 12H:
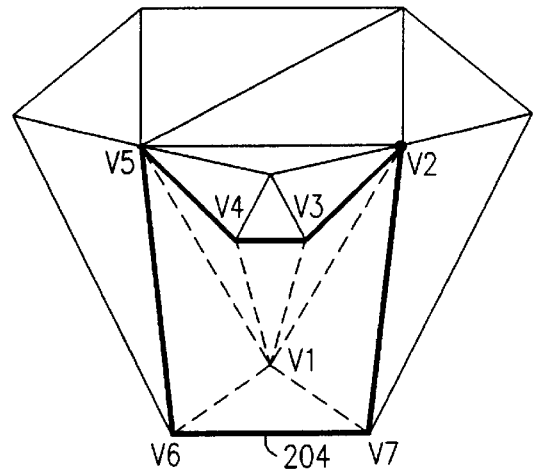
Figure 12I:
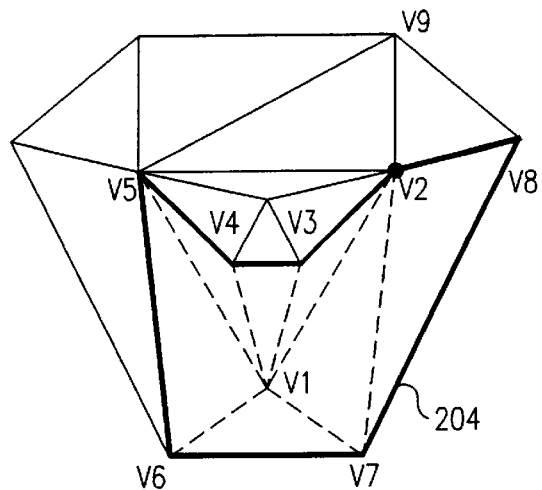
Figure 12J:
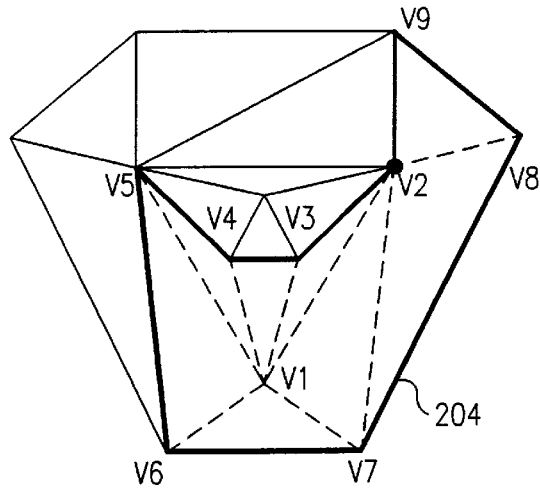
Figure 12K:
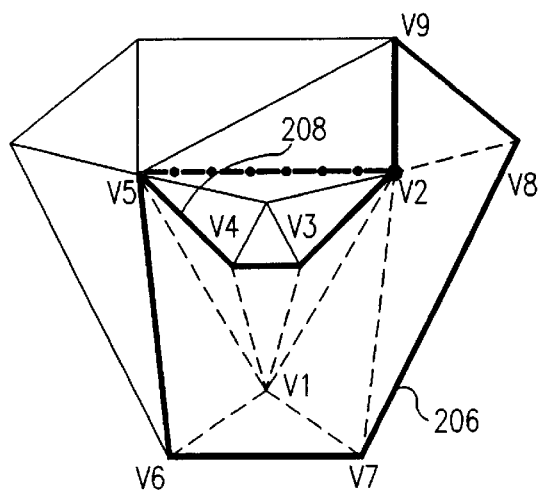
Figure 12L:
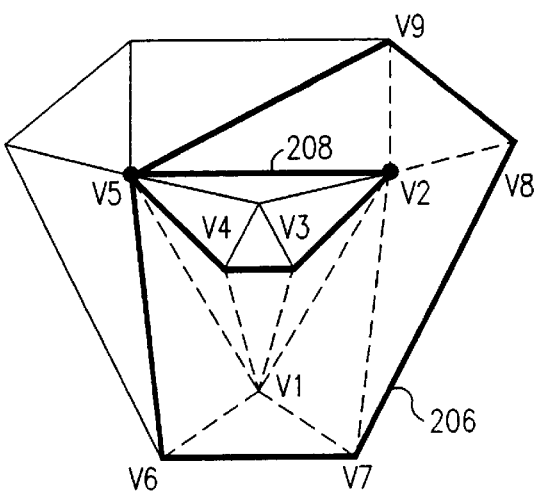
Figure 12M:
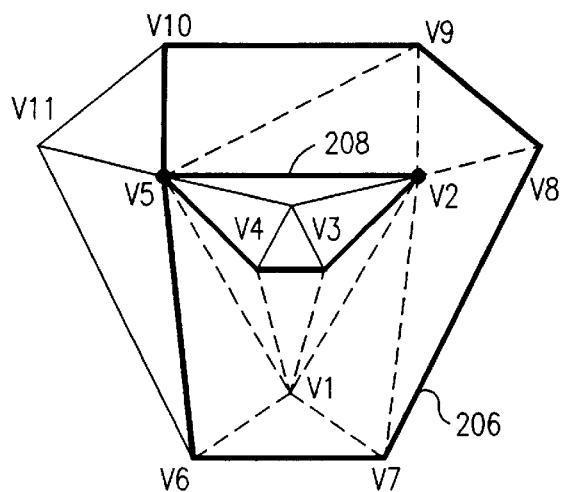
Figure 12N:
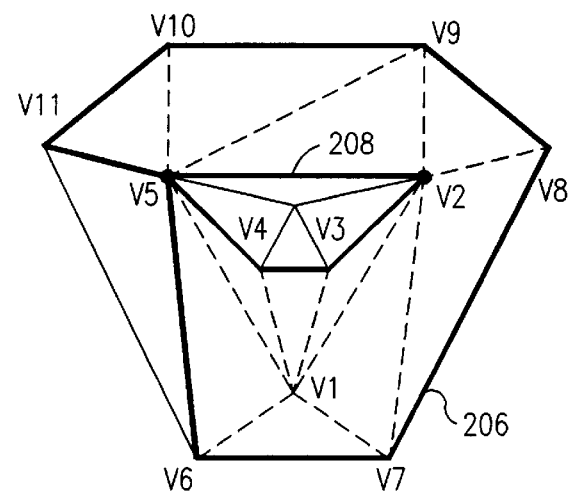
Figure 12O:
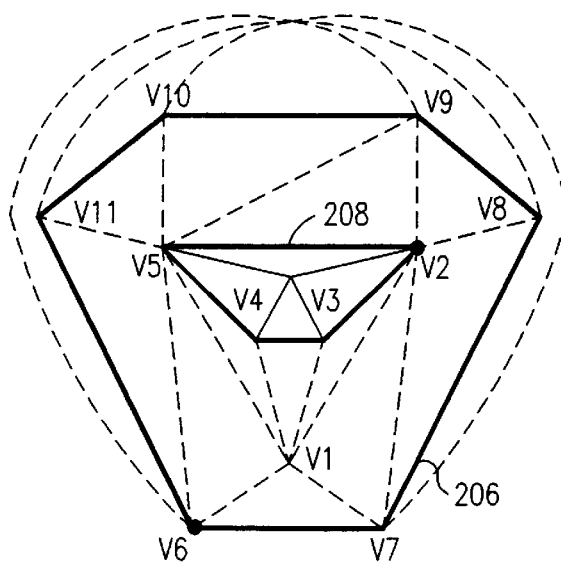
Figure 12P:
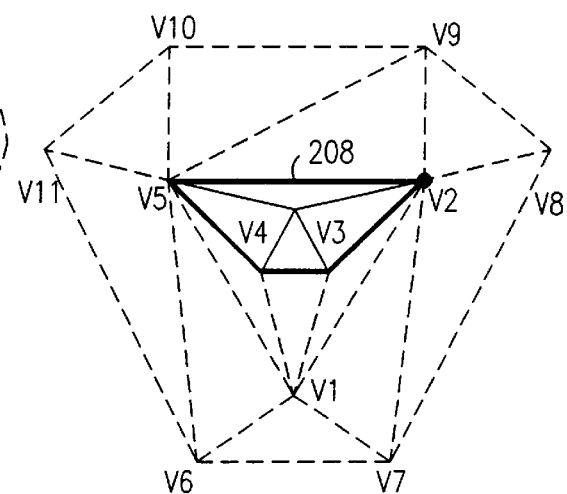
Figure 12Q:
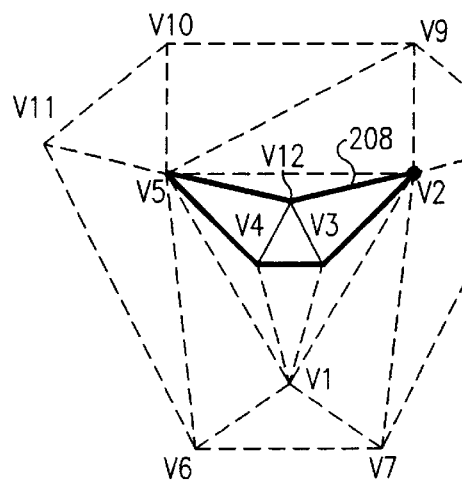
Figure 12R:
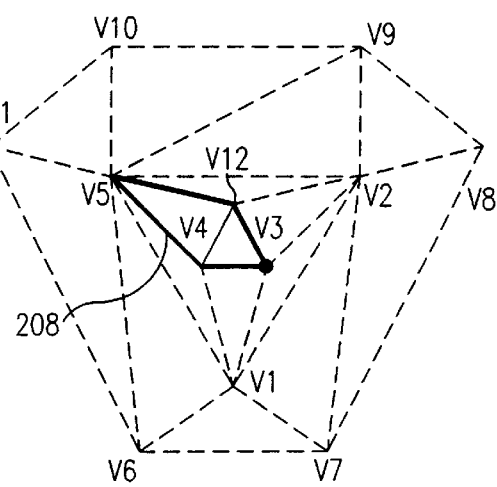
Figure 12S:
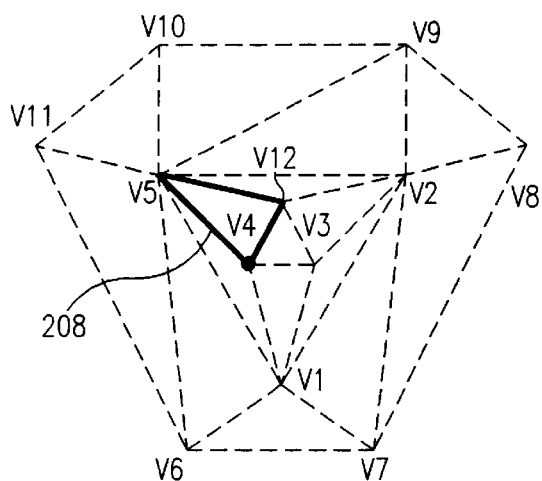
Figure 12T:
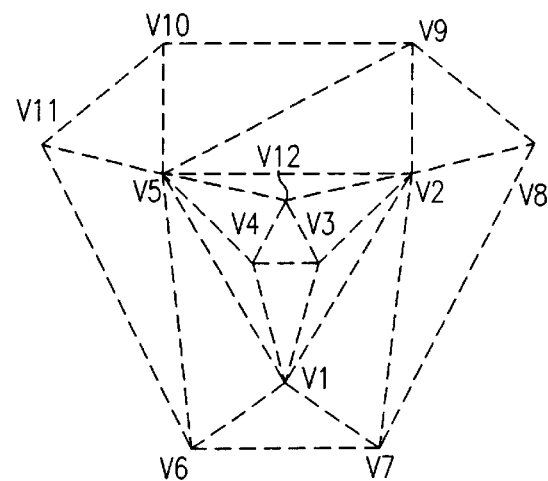

FIGS. 12A–12T illustrate a step-by-step example of performing the method of the flow chart of FIG. 9 on a mesh 200, in accordance with a preferred embodiment of the present invention. As described above, mesh 200 shown in FIG. 12A, has an open boundary 202, and therefore a dummy vertex 203, as shown in FIG. 12B is added to mesh 200, connecting to vertices A, B, C, D, E and F, which are on the open boundary. In FIG. 12C a triangle V1,V2,V3 is chosen arbitrarily or according to any suitable optimization method, as described hereinabove, to be a beginning active list, indicated by a bold line 204. Vertex V1 is assigned as focus, and its unvisited edges are traversed in succession, as shown in FIGS. 12D, 12E and 12F, resulting in the active list indicated in FIG. 12G.

At this point vertex V1 is full and is removed from the active list, resulting in the state shown in FIG. 12H. Vertex V2 consequently becomes focus, and its edges are traversed in a counter-clockwise order, adding vertices V8 and V9 to the active list as shown in FIG. 12I. At this stage, the next free edge of focus V2 leads to vertex V5, which is already on active list 204. Therefore, as described above, active list 204 is split in two, a first active list 206 from u (V5) and on and back to the focus, and a second active list 208 from the focus to u.

As shown in FIG. 12K, the first active list 206 includes vertices V2, V5, V6, V7, V8, V9, and the second active list 208 includes vertices V2, V3, V4, V5. Edge (V2,V5) is common to both active lists 206 and 208. It is noted that the order of the vertices in active lists 206 and 208 is the same as in active list 204. Second active list 208 is pushed onto the stack, and processing continues with first active list 206. No unvisited edges remain at vertex V2 outside of active list 206, i.e., to the right of one moving in an ascending manner along the active list. Therefore, vertex V2 is removed from active list 206.

Vertex V5 now becomes the focus of active list 206, resulting in the state shown in FIG. 12L. The edges incident on the focus V5 which are outside of active list 206 are traversed, adding vertices V10 and V11 to the active list, as shown in FIGS. 12M and 12N. Vertex V5 is then removed from active list 206, and vertex V6 becomes the focus, as shown in FIG. 12O. The procedure continues as usual, until active list 206 is empty, as shown in FIG. 12P.

Active list 208 is now popped from the stack, and processing begins from focus V2. Vertex V12 is visited, as shown in FIG. 12Q, and vertex V2 is removed from active list 208, as shown in FIG. 12R. The focus is now vertex V3, which is also full and therefore is removed from the active list, resulting in the state shown in FIG. 12S. At this stage, all of the vertices are full, and they are all removed from the active list, as shown in FIG. 12T. The stack is empty, and the entire mesh was encoded; therefore, the process is finished. The code generated by the above described process is as follows: {add 6, add 7, add 4, add 4, add 8, add 5, add 5, add 4, add 5, split 5, add 4, add 4, add dummy 6, add 4}.

Figure 13:
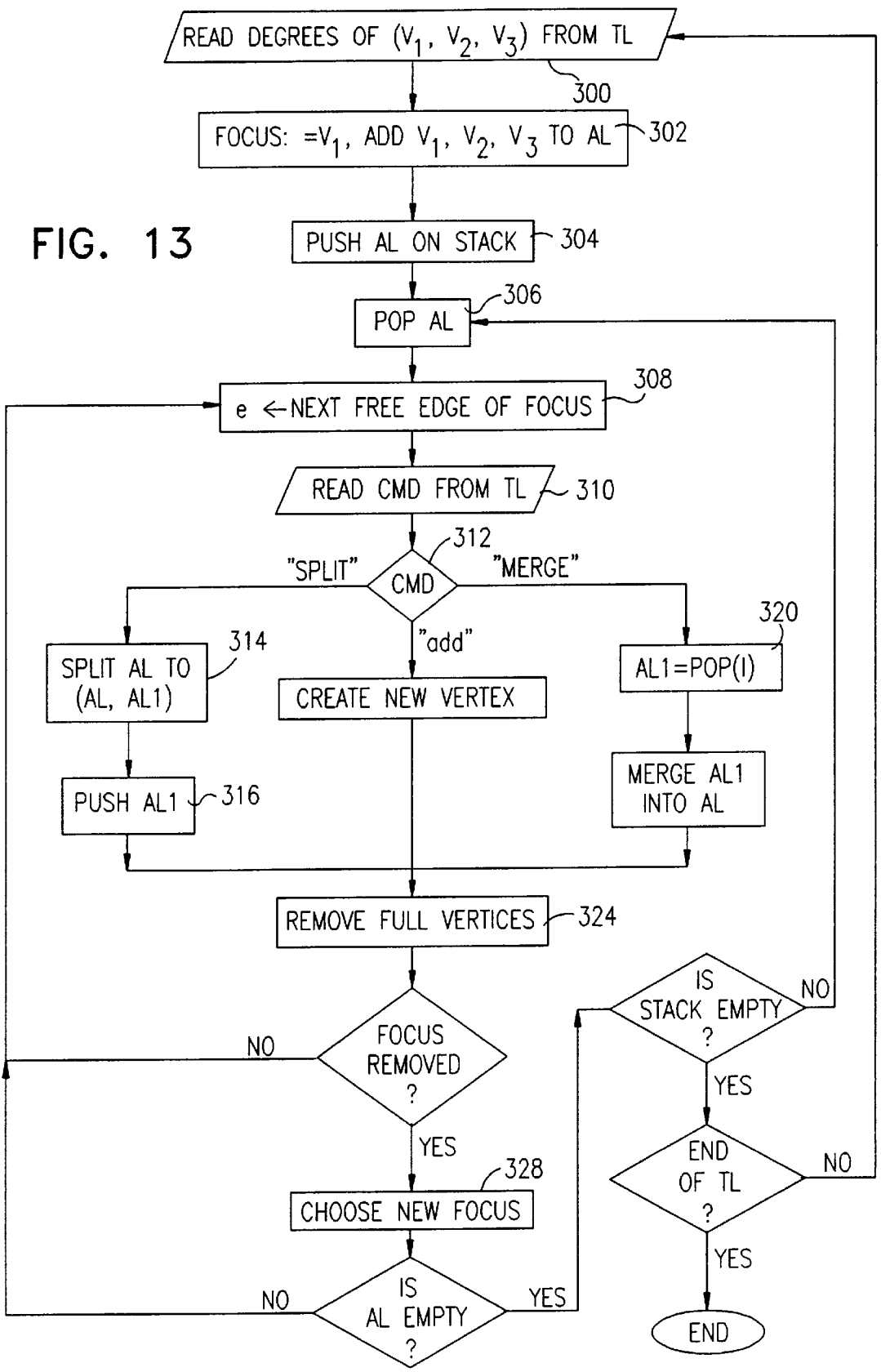
FIGS. 13 is a flow chart illustrating operations performed in decompressing a topology list indicative of the topology of a mesh, in accordance with a preferred embodiment of the present invention.

FIG. 13 is a flow chart showing the operations performed in reconstruction of the topology of a mesh from a topology list, in accordance with a preferred embodiment of the present invention. These operations are also illustrated by the pseudo-code in table 3.

TABLE 3

Procedure DecodeConnectivity (TmeshPtr pM)
{
  ActiveList AL,AL1;
  Stack S;
  while not EOF {
    read degrees of vertices (v1,v2,v3);
    pM->add(v1,v2,v3); // triangle
    AL.add(v1,v2,v3);
    AL.focus := v1;

TABLE 3-continued

```
      S.Push(AL);
      while not S.Empty() {
        AL := S.Pop();
        while not AL.Empty() {
          e := AL.focus.FreeEdge();
          cmd := ReadCommand();
          if cmd = "add <deg>" {
            Vertex u(deg);  // create new vertex u, with the given degree
            AL.Add(u); // insert u between focus and its predecessor
            pM->Add(u); // update the mesh to have two more edges
          } else
          if cmd = "split <offset>" {
            (AL,AL1) := AL.Split(e,offset); // split AL into two at the given offset
            S.Push(AL1);
          } else
          if cmd = "merge <i> <offset> {
            AL1 := S.Pop(i); // pop the i'th active list from the stack. It must be there.
            AL.Merge(AL1,offset); // merge the two active lists together at the given offset
          }
          AL.RemoveFullVertices();
          if AL.focus.Full()
              AL.focus := AL.focus.NextNeighbor();
        }
      }
    }
}
```

As described in block 300, the first three commands (which are inevitably "add") and degrees are read from the topology list, and three vertices having the respective degrees are added to a mesh being reconstructed. These vertices also form the active list, and the first vertex is preferably chosen to be the focus. Thereafter, as indicated in block 306, the active list is pushed onto a stack in preparation for a loop starting in block 308.

As indicated in block 308, the edges of the focus are traversed in a counter-clockwise order, and e is assigned the next free edge. Preferably, u is the vertex on the other end of e from the focus. The command associated with u is read at block 310, and used at block 312 to decide what action to take next. When the next command on the topology list is the "add" command, the degree of u is read from the topology list, and vertex u is created on the other end of e, together with edges which connect u to the mesh. u is then added to the active list together with the created edges.

If, however, the command is "split", vertex u exists on the current active list, and the active list AL is split, as indicated in block 314, into two lists: AL and AL1 according to the offset read with the command. Preferably, the offset indicates an index of a free edge in AL1, around which the split occurred. Further preferably, the offset indicates the number of free edges incident on the vertices on the active list between the focus and u which are on the same side of edge e. In the reconstructed mesh, the total number of free edges incident on u is divided between the active lists accordingly. Preferably, AL1 is pushed on the stack for later processing, as indicated in block 316, while processing continues with AL.

If the command is a "merge" command, it has two parameters: I, which is the index of the active list (AL1) to be popped from the stack, and an offset which indicates where the merge occurs. Preferably, the offset indicates a free edge of AL1 which during the merge connects u on AL1 to the focus of the current active list. Preferably, the offset indicates the number of free edges between the focus of AL1 and the indicated free edge. AL1 is assigned the active list which contains u, as indicated in block 320, and AL and AL1 are merged by connecting two parallel (overlapping) edges that both connect u with the focus of the current active list. In the mesh the two parallel edges are really one edge and they are considered as two in order to close a cycle of the active list. For example, if the current active list AL is (A1, A2, A3, A4, A5) with A3 as focus, and AL1 is (B1, B2, B3, B4) with B2 as focus, then the resulting merged list is (A1, A2, A3, B2, B3, B4, B1, B2, A3, A4, A5), and the focus of the merged active list is the first occurrence of A3. The two parallel edges are (A3, B2) and (B2, A3).

After the command is processed, it is determined whether any vertices have exhausted all of their edges, and these vertices are removed from the list, as indicated in block 324, with appropriate addition of edges where necessary. The removal of vertices is performed recursively, such that if addition of edges due to removal of one vertex causes another vertex to become full, that vertex is also removed. If the focus was removed, a new focus is assigned, as indicated in block 328, and processing continues until the active list is empty. When the active list is empty, the other active lists on the stack are processed in substantially the same manner until the stack is empty. If the topology list is empty, the mesh is completely reconstructed; but if data remains in the topology list, processing returns back to block 300 to reconstruct other parts of the mesh. These other parts are topologically disconnected from the parts that have been decoded so far.

Figure 14A:
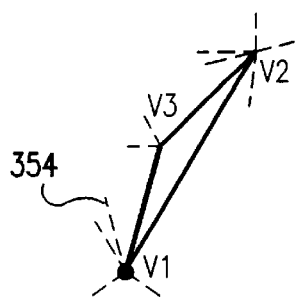
FIGS. 14A–14S show a step-by-step example of performing the method of FIG. 13, in accordance with a preferred embodiment of the present invention.
Figure 14B:
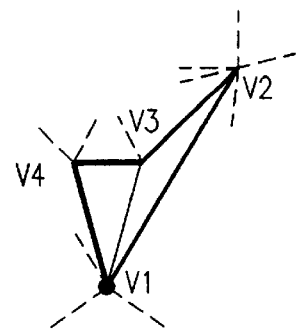
Figure 14C:
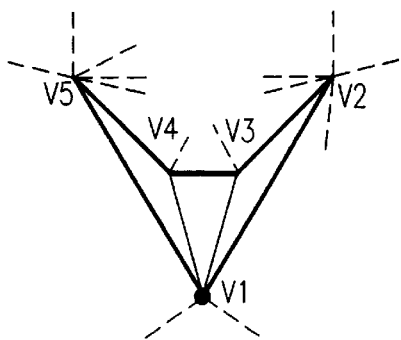
Figure 14D:
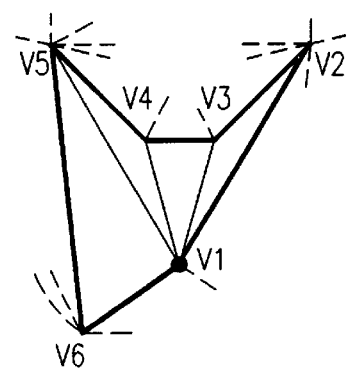
Figure 14E:
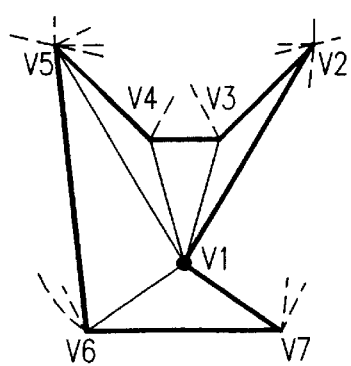
Figure 14F:
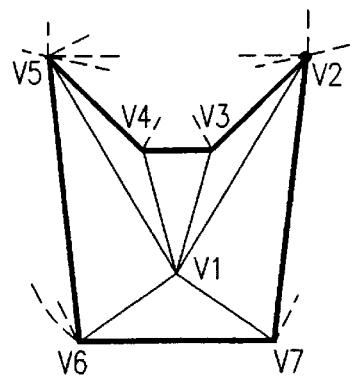
Figure 14G:
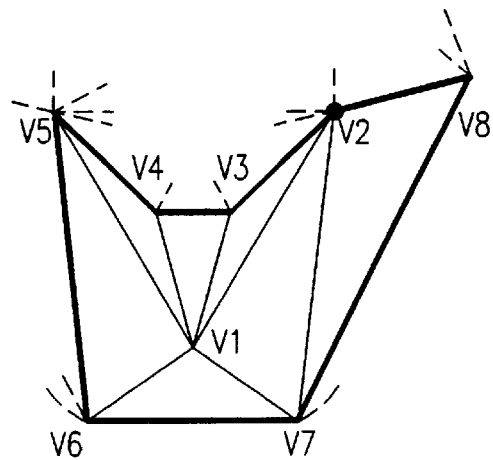
Figure 14H:
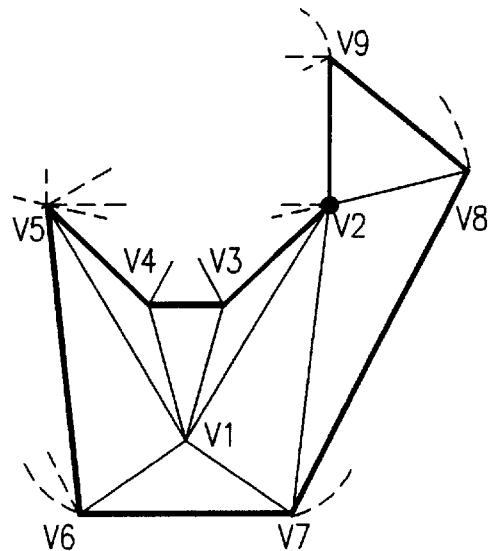
Figure 14I:
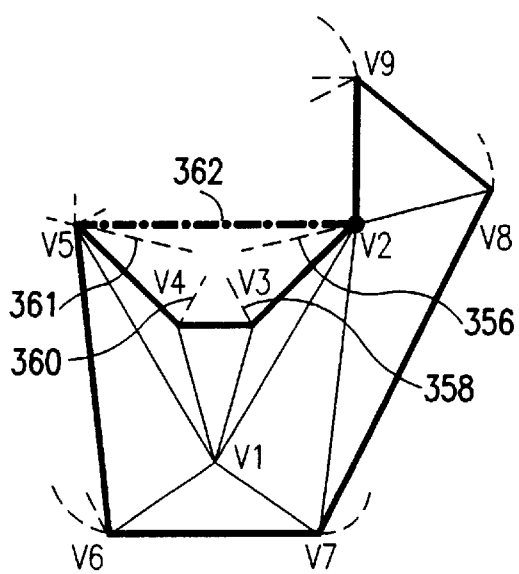
Figure 14J:
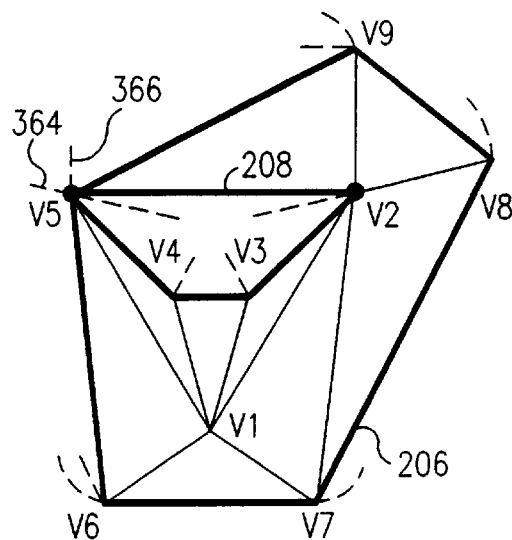
Figure 14K:
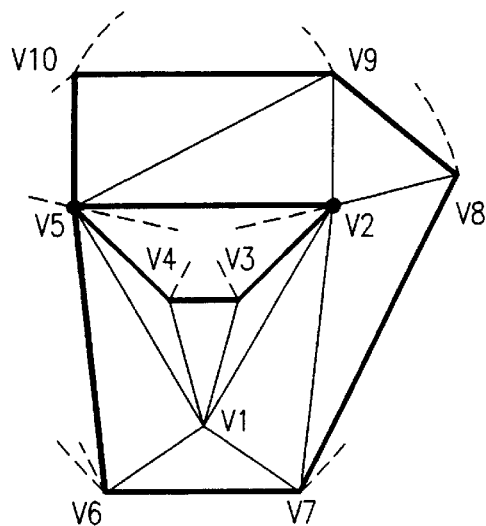
Figure 14L:
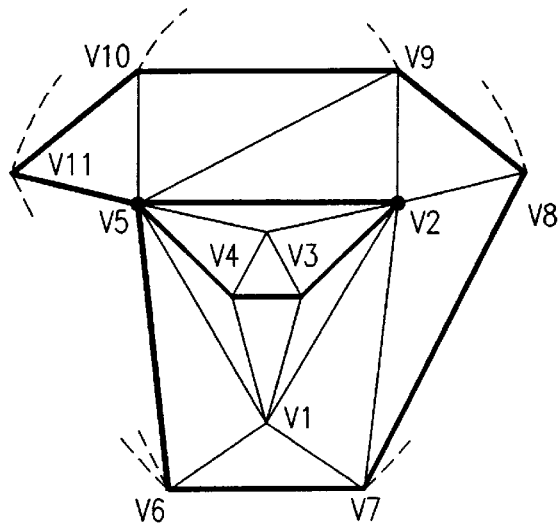
Figure 14M:
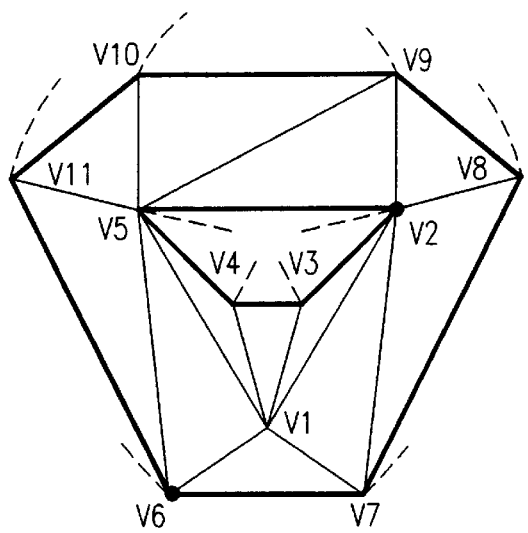
Figure 14N:
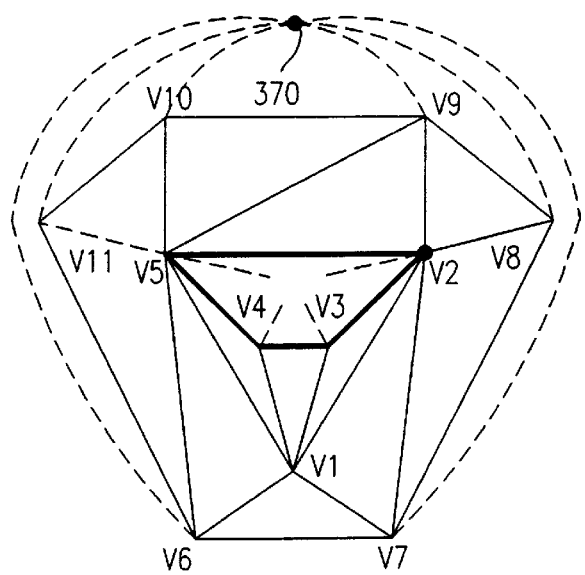
Figure 14O:
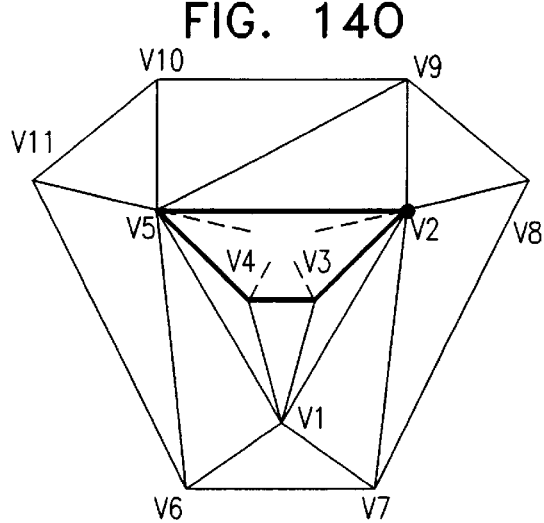
Figure 14P:
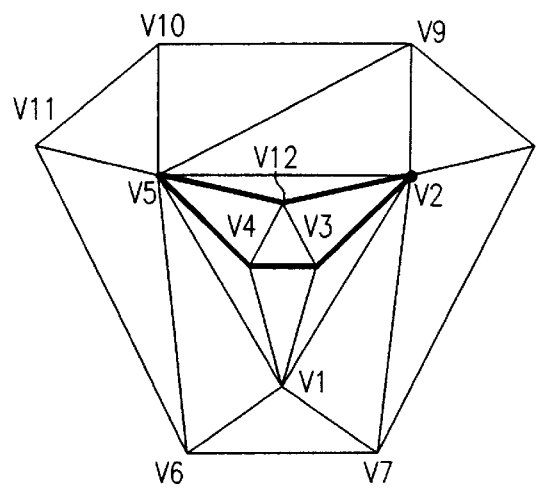
Figure 14Q:
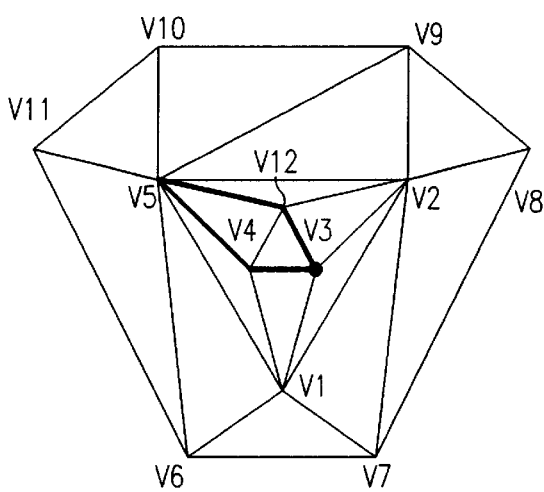
Figure 14R:
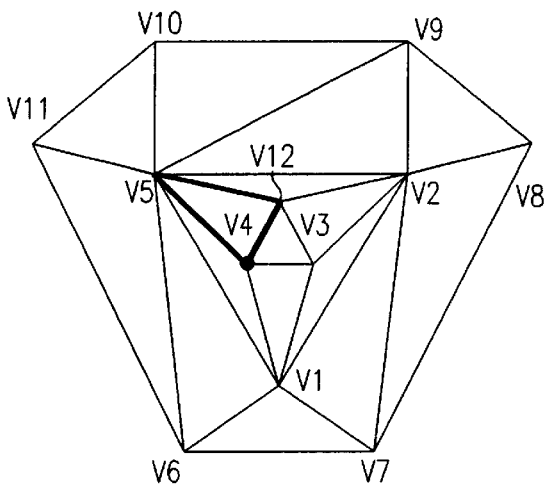
Figure 14S:
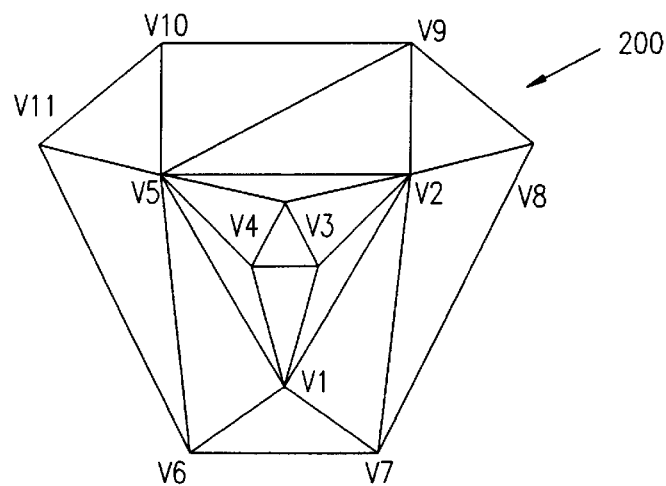

FIGS. 14A–14S illustrate a step-by-step example of performing the method of the flow chart of FIG. 13 on a topology list (TL) describing mesh 200 (shown in FIG. 12A), in accordance with a preferred embodiment of the present invention. As described above, the topology list is {add 6, add 7, add 4, add 4, add 8, add 5, add 4, add 5, split 5, add 4, add 4, add dummy 6, add 4}.

As shown in FIG. 14A, the three first commands on TL are read. These commands must be "add," and three vertices whose degrees are read along with the commands are constructed. The first vertex V1 is assigned as the focus. The next command read is applied to the focus and the next free counter-clockwise edge 354 incident on the focus. Since the command is "add 4", a vertex V4 is added to the active list AL according to the degree read with the command, as shown in FIG. 14B. Consequently, an edge between V3 and V4 is also added to the list.

The next command is "add 8" which causes the addition of V5, as shown in FIG. 14C. V5 has 8 incident edges, including six free edges indicated by dotted lines and (V4,V5) and (V5,V1). Similar steps are performed according to the next two commands, as shown respectively in FIGS. 14D and FIG. 14E. At this stage, the degree of the focus V1 is exhausted and V1 is removed from the active list, causing edge (V2,V7) to replace edges (V1,V2) and (V1,V7) on the active list, as shown in FIG. 14F.

The next vertex on the active list, V2, is chosen as focus. The degree of V2 is 7, and 3 edges have been created: (V1,V2), (V2,V3) and (V2,V7). The "add 4" command is next on the topology list and therefore, as shown in FIG. 14G, vertex V8 is created with 4 incident edges. Likewise vertex V9 is created with 5 incident edges as shown in FIG. 14H.

The next command is "split 5", so that 5 free edges on vertices along (ascending) the active list are counted. There is one more free edge 356 on V2, one free edge 358 and 360, respectively, on each of V3 and V4, a free edge 361 incident on V5, and a fifth free edge 362 as indicated by a dashed thick line in FIG. 14I. Free edge 362 is the edge about which the split is performed. Thus, we know two facts: one that the split is performed along edge (V2,V5), and another that one free edge incident on V5 is within the new active list (V2, V3, V4, V5). Two active lists result: AL1=(V2, V3, V4, V5), which runs from the focus V2 to V5; and (V2, V5, V6, V7, V8, V9), which is the rest of the current active list. AL1 is pushed onto the stack for later processing, and the process continues with AL.

Since a "split" command was performed, it is understood that V2 has no more edges outside of AL that have not been recreated, and therefore V2 is removed from AL, as indicated in block 324 of FIG. 13. V5, the next vertex in AL, is chosen as focus, as shown in FIG. 14J. The next two commands, both "add 4", are used on the two free edges 364 and 366 of V5 in the current active list, so that V10 and V11 are created each with four incident edges, as shown in FIGS. 14K and 14L. Thus, all of the free edges of V5 in the current active list are created. V5 is therefore full and is removed from the active list.

In order to maintain connectivity of the mesh, edge (V6,V11) is added to the active list, as shown in FIG. 14M. V6 is appointed as focus, and the command "add dummy 8" is applied to create a dummy vertex 370. V6 is full and is therefore removed from the active list, and an edge connecting V7 and dummy vertex 370 is added. This causes V7 to become full, and when it is removed, V5 becomes full, as well. This process continues until V11 is removed, and only dummy vertex 370 is in the active list. Since vertex 370 is also full, it is removed. As it is a dummy vertex it is totally removed from the mesh together with its incident edges.

The next active list on the stack is now processed, as shown in FIG. 14O. The command "add 4" is executed at V2, creating V12, as shown in FIG. 14P. Vertex V2 is full and is removed, causing V3 to fill and be removed, as well, as shown in FIG. 14R. V4, V5 and V12 are then also full and are removed, as shown in FIG. 14S, resulting in complete reconstruction of mesh 200, which was used to generate the topology list initially.

Figure 15:
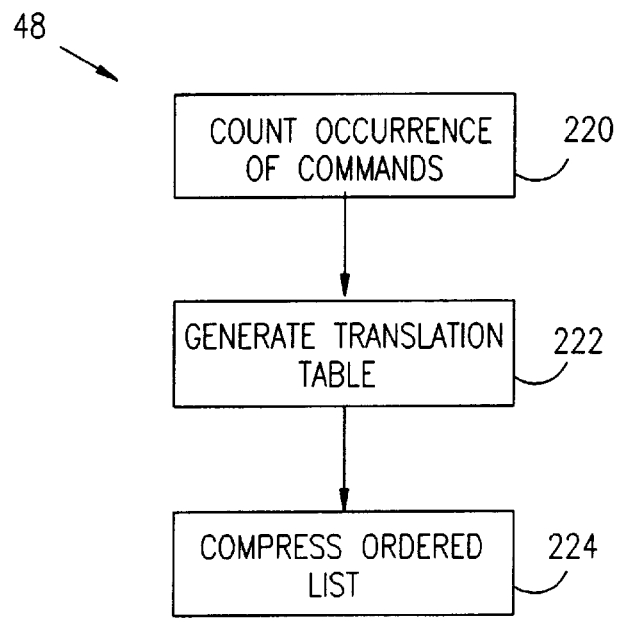
FIG. 15 is a flow chart illustrating a method of compression of a topology list, in accordance with a preferred embodiment of the present invention.

FIG. 15 is a flow chart showing a method for compression of the topology list, in accordance with a preferred embodiment of the present invention. The flow chart of FIG. 15 illustrates one preferred detailed embodiment of block 48 of FIG. 3. The object of the method is to compress the list using Huffman-type coding, in either binary or functional form.

As indicated in block 220, the occurrence of each command ("add", "add dummy", "split", "merge") in the topology list is counted. Likewise, the occurrence of the parameters, e.g., vertex degrees for the "add" command, are also counted. A translation table is then generated according to the count, as indicated in block 222. Preferably, each entry in the translation table represents a command with its parameter. Alternatively, the commands and parameters are encoded separately in the topology list. Further alternatively, separate entries are allotted to frequent combinations of commands and parameters, such as "add 6", while relatively rare combinations are encoded using separate entries for the command and the parameter. Preferably, the occurrences are counted for each mesh separately, and a translation table is annexed to the compressed topology list to allow decoding of the list. Alternatively, the translation table is determined in advance, according to a general count performed on a number of representative meshes, and need not be annexed to the compressed list.

In one preferred embodiment of the present invention, for example, the result of such a general count is that the command "add 6" has a most frequent occurrence, while neighboring degrees have next-most frequent occurrence. The "split" command is normally infrequent, and the "merge" command appears even more seldom.

Further alternatively, the occurrences of the commands are counted for each particular mesh, and the results of the counts are compared to the counts of common meshes. If the differences are small, the common count is used, thus avoiding the necessity of annexing the translation table to the compressed list. However, if the differences are substantial, the count of the particular mesh is used, and the translation table is annexed to the topology list with an appropriate indication, such as setting a flag in a data header.

The translation table is preferably formed such that the most common commands receive short bit codes, while less frequent commands receive longer bit codes. Preferably, the translation table is generated using an entropy coding algorithm, such as a Huffman algorithm, as is known in the art.

As indicated in block 224, the topology list is compressed in accordance with the translation table, and if the table is not a general table, it is annexed to the compressed list. Preferably, run-length encoding, as is known in the art, is performed on the resulting compressed list to further compress the list.

In tests performed by the inventors, it has been found that the above-described methods of topology coding and compression yield a compression rate of less than one bit per vertex generally, and in regular topologies, for example, topologies in which most interior vertices have a degree of 6, about 0.2 bits per vertex. This performance is achieved due to long runs of the command "add 6," which are drastically compressed by the run-length encoding.

It is noted that because the "split" and "merge" commands are encountered rarely during compression, the encoding and decoding procedures have a complexity which is linear in the number of edges in the mesh.

Figure 16:
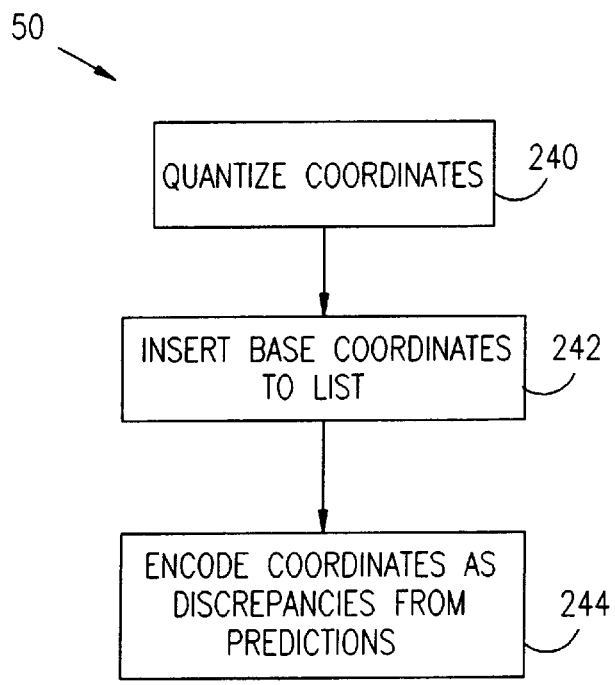
FIG. 16 is a flow chart illustrating a method of generating a coordinate list, in accordance with a preferred embodiment of the present invention.

FIG. 16 is a flow chart showing a method for generating a coordinate list, in accordance with a preferred embodiment of the present invention. The flow chart of FIG. 16 represents one preferred detailed embodiment of block 50 of FIG. 3.

As indicated in block 240, the coordinates of the vertices are quantized to a selected number of bits, generally between 8 and 12, as is known in the art. Alternatively or additionally, the number of bits used in quantization is a function of characteristics of the object, particularly the local resolution of its surfaces. Preferably, the quantization allocates a large number of bits for dense areas of a surface and a low number of bits for sparse areas.

Thereafter, a compressed coordinate list, preferably parallel to the topology list, is generated. The quantized coordinates of a few vertices, typically corresponding to the initial vertices in the topology list, i.e., those chosen in block 150 of FIG. 9, are inserted into the compressed coordinate list, as indicated in block 242. The coordinates of the rest of the vertices are preferably encoded in the list in the form of a discrepancy from respective predicted values, as indicated in block 244.

Preferably, the predicted values are generated based on the coordinates of vertices higher up in the list. Preferably, the prediction is based on coordinates of two or more vertices, more preferably of three vertices and most preferably of at least five vertices.

Figure 17:
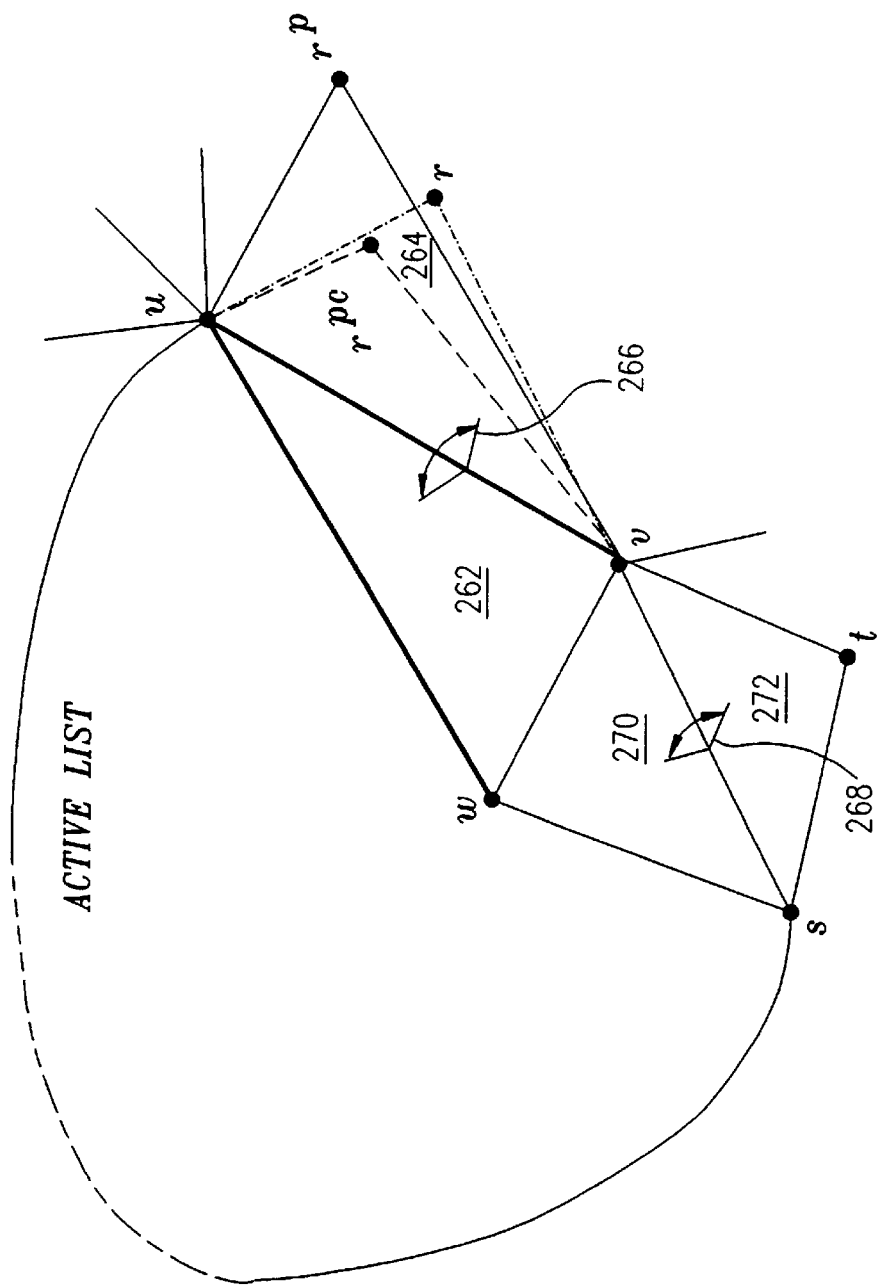
FIG. 17 is a graph which schematically illustrates a part of a mesh used for coordinate prediction of a vertex thereof, in accordance with a preferred embodiment of the present invention.

Reference is now made to FIG. 17, which is a schematic illustration of a part of a mesh used for coordinate prediction of a vertex r of a triangle 264, in accordance with a preferred embodiment of the present invention. A plane prediction ($r^P$) of vertex r, i.e., a prediction based on an assumption that r is in a plane defined by an adjacent triangle, is generated based on the coordinates of the vertices of the adjacent triangle. Preferably, the plane prediction is based on coordinates of the vertices of a triangle having a common edge with a triangle of which r is a vertex. Preferably, the triangle having r as a vertex which is used for this purpose is the triangle that includes the two edges added to the active list along with vertex r during encoding of the topology, as described above in conjunction with FIG. 5.

In FIG. 17, vertices u, v and w are the vertices of a triangle 262 having edge uv in common with triangle 264, which includes vertex r and edges ru and rv. Preferably, the plane prediction $r^P$ forms a parallelogram with vertices u, v, w and $r^P$ according to equation (1), in which $\vec{u}, \vec{v}, \vec{w}$, are vectors from an origin to the respective vertices:

$$\vec{r}^P = \vec{v} + \vec{u} - \vec{w} \quad (1)$$

A crease-adapted prediction $r^{Pc}$, which is based on plane prediction $r^P$, will generally be closer to r than plane prediction $r^P$. Crease-adapted prediction $r^{PC}$ takes into account, and tries to predict, a crease angle 266 between the planes defined respectively by triangles 262 and 264 along edge uv. Preferably, crease angle 266 is predicted according to the crease angle between pairs of triangles adjacent to the pair of triangles 262 and 264. Further preferably, two such pairs of triangles are taken with common edges closest to parallelism with the common edge (u,v). Preferably, the predicted crease angle is an average of the crease angles between the triangles in each pair. Alternatively, the crease angle is predicted according to a crease angle 268 between at least one pair of triangles (270 and 272) whose topology was previously encoded. Thus, the geometry and topology may be encoded in one pass over the mesh.

In a preferred embodiment of the present invention, crease-adapted prediction $r^{PC}$ is used as a prediction for r, and the coordinates of r are indicated in the coordinate list by the offset between r and $r^{PC}$. Alternatively, plane prediction $r^P$ is used as the prediction of r, or any other suitable prediction, including non-linear predictions of r or of crease angle 266.

The offsets between the actual and predicted coordinates of r are preferably encoded in the coordinate list using an entropy code, such as a Huffman code. Alternatively or additionally, an explicit codebook including a group of the most common offset values is defined in the compression and decompression software. Typically, the most common values comprise values evenly surrounding zero. Preferably, the remaining offset values are encoded using a fixed rate code. Preferably, the number of values in the code book is between 16 and 128, most preferably, 32 values.

Preferably, the compressed topology and coordinate lists are transferred to the receiving computer which reconstructs the mesh from the lists.

Although the above description relates generally to efficient transmission and storage of triangle meshes, in other preferred embodiments of the present invention, a method is provided for efficient rendering of triangle meshes. Referring back to FIGS. 8A–8F, mesh 30 (FIG. 2) is preferably rendered by a rendering device according to the order of its topology list. Common rendering devices, such as hardware devices compatible with GL and OpenGL libraries, are limited in their memory to three memory registers for vertex storage.

In mesh 30, triangle (U1,U2,U3) is the first to be rendered. Geometric projection and clipping, as are known in the art, are applied to its vertices during rendering, as well as to all other rendered vertices. The projections of focus U1 and U3 are kept in the memory of the rendering device since they appear in the next triangle (U1,U3,U4). When the next triangle is rendered, only vertex U4 must undergo geometric projection and clipping since the projections of U1 and U3 are already in the memory.

This process repeats for the next two triangles (U1,U4,U5) and (U1,U5,U6), each of which requires projection of only one vertex. When the focus is replaced, the new focus is projected for a second time and generally for the last time, since when the focus is removed it has no free edges and belongs to no more triangles. Thus, in rendering triangle (U1,U6,U2) only U2 is projected. In the same manner triangles (U2,U6,U7), (U2,U7,U8) and (U2,U8,U9) all require projection of only one vertex, since they all have a common edge with the previous rendered triangle.

Thus, when "add" commands are involved, each vertex is generally projected twice, once when it is first introduced and a second time when it is appointed as focus. It is noted that when a vertex is added using the "add" command, the second vertex in the triangle listing is replaced in order to receive the next triangle, a process referred to as triangle fanning, while when the focus is replaced the first vertex in the triangle listing is replaced, a process referred to as triangle stripping. For best performance, it is preferable to use a graphics library capable of switching between triangle fanning and switching, such as the Iris GL, available from Silicon Graphics, Inc.

When "split" and "merge" commands are involved, more projections must be made, but these commands appear seldom and have relatively little influence on the average number of projections in general meshes. Since the speed of rendering is dependent on the number of vertices undergoing projection, the average of two projections for each vertex made possible by the present invention is a great improvement relative to the average of six projections based on the average number of triangles including each vertex.

Figure 18:
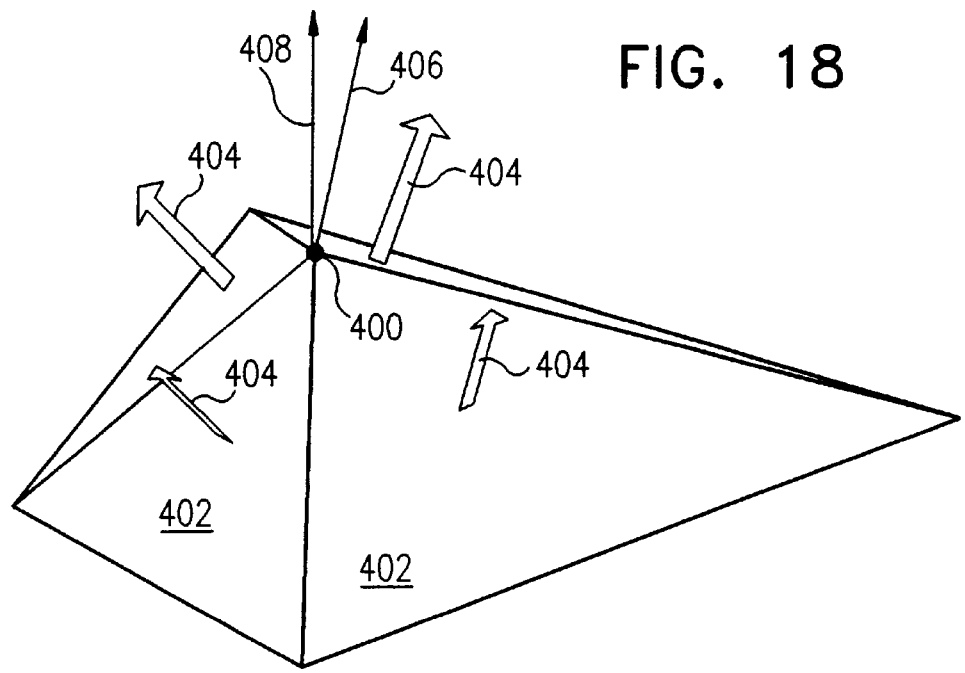
FIG. 18 is a graph which illustrates prediction of a normal to a vertex, in accordance with a preferred embodiment of the present invention.

FIG. 18 is a graph which illustrates prediction of a normal to a vertex, in accordance with a preferred embodiment of the present invention. Some triangle meshes include, in addition to topology and geometry information, information on vectors, specifically unit vectors such as normals to a surface including the vertex, associated with some or all of the vertices in the mesh. The normals are used, for example, in shading of rendered images. Preferably, the directions of these normals are encoded in a normal list using a prediction method as described hereinbelow.

In the example of FIG. 18, vertex 400 is surrounded by four triangles 402. Each triangle 402 is defined by the coordinates of its vertices, and therefore a normal 404, of unit length, to each triangle 402 may be calculated definitively. Vertex 400 has a normal vector 406 associated with it. A prediction vector 408 of normal vector 406 is calculated by adding all of triangle normals 404. The normal list preferably includes for each vertex, in the order used in the topology list, an indication of the difference between normal vector 406 and prediction vector 408.

Figure 19:
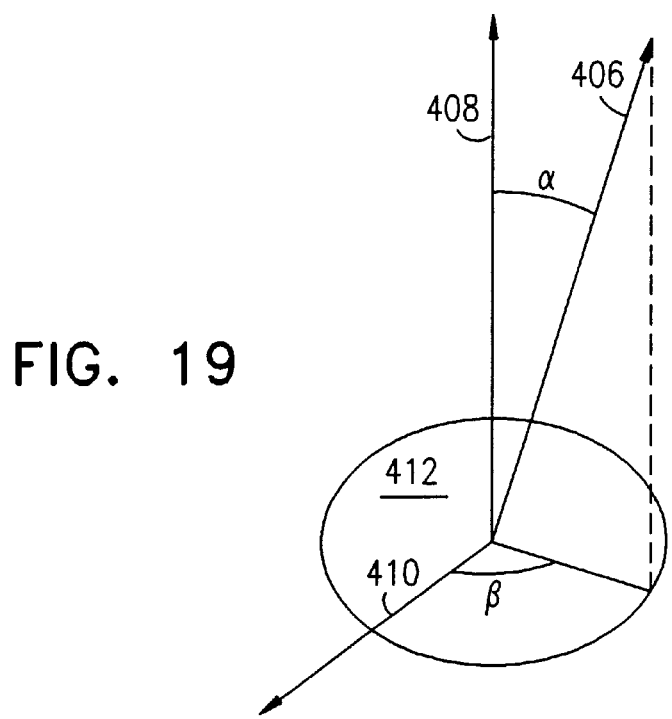
FIG. 19 is a graph which illustrates angles used for prediction of a normal vector, in accordance with a preferred embodiment of the present invention.

FIG. 19 is a graph which illustrates angles used for prediction of normal vector 406, in accordance with a preferred embodiment of the present invention. Preferably, the difference between normal vector 406 and prediction vector 408 is indicated using two angles, an angle $\alpha$ between normal vector 406 and its prediction vector 408, and an angle $\beta$, which is the rotation of normal vector 406 around prediction vector 408. Preferably, a third vector 410 is defined as perpendicular to both vectors 406 and 408, and $\beta$ is the angle between vector 410 and the projection of normal vector 406 on a surface 412 which contains vector 410 and is perpendicular to prediction vector 408.

Preferably, angles $\alpha$ and $\beta$ are encoded as a point on a unit sphere. Preferably, $\alpha$ and $\beta$ are quantized and indicated by indices. The quantization intervals of $\alpha$ are preferably constant while the quantization intervals of $\beta$ preferably vary according to the sine of $\alpha$, as quantized.

Preferably, a plurality of points are chosen on the unit sphere according to the above mentioned quantization intervals, and $\alpha$ and $\beta$ are encoded as the chosen point closest to a point that they define on the unit sphere. Further preferably, the plurality of chosen points are ordered in a spiral and numbered using a single index which identifies their position along the spiral. Preferably, the spiral begins from the north pole of the unit sphere, which indicates there is no difference between vectors 406 and 408, down to the south pole, which indicates that the prediction is in the opposite direction from the normal. It is noted that in nearly all cases the predictions accumulate around the north pole. Alternatively, for each vertex the normal list comprises two indices which identify $\alpha$ and $\beta$ separately. Preferably, the indexes in the normal list are entropy coded using a Huffman code.

In experiments performed by the inventors, compression in accordance with a preferred embodiment of the present invention was compared to the compression method due to Taubin. On the average, Taubin achieved a compression of about 3.8 bits/vertex for the topology data and 13.3 bits/vertex for the geometry data. The method in accordance with the preferred embodiment of the present invention achieved a compression of about 1.4 bits/vertex for topology data and about 9.0 bits/vertex for geometry data. The relative improvement ratio of the preferred embodiment of the present invention relative to Taubin is about 0.34 for the topology data and 0.69 for the geometry data. All together the improvement ratio is about 0.61.

It is noted that although the above described preferred embodiments are related to methods of compression of a three dimensional mesh, the principles of the present invention may be used for compression of topology and/or geometry data included in any data structure and of any dimensionality.

It will be appreciated that the preferred embodiments described above are cited by way of example, and the full scope of the invention is limited only by the claims.

What is claimed is:

1. A method for compressing a mesh having a plurality of vertices, each vertex characterized by a degree equal to the number of edges incident thereon, comprising:

arranging substantially all of the vertices in a consecutive order;

generating a topology list including the degrees of the vertices in the consecutive order; and providing a coded stream of signals comprising the topology list.

2. A method according to claim 1, wherein arranging the vertices in the consecutive order comprises arranging the vertices in at least one sub-list in which the vertices are ordered along a contour of the mesh.

3. A method according to claim 2, wherein the contour has a generally spiral shape.

4. A method according to claim 2, wherein the at least one sub-list comprises a number of sub-lists, the number determined according to a characteristic of the mesh.

5. A method according to claim 4, wherein generating the topology list comprises inserting into the topology list an indication of the vertices at which two of the number of sub-lists meet.

6. A method according to claim 1, wherein arranging the vertices in the consecutive order comprises arranging the vertices such that a topology of the mesh may be regenerated using substantially only the topology list.

7. A method according to claim 1, and comprising checking whether the mesh has at least one open boundary and adding a dummy vertex which is connected to vertices on the open boundary, for each open boundary in the mesh.

8. A method according to claim 1, wherein providing the coded stream of signals comprises compressing the topology list.

9. A method according to claim 8, wherein compressing the topology list comprises applying an entropy coding algorithm.

10. A method according to claim 9, wherein compressing the topology list comprises applying a Huffman algorithm.

11. A method according to claim 9, wherein applying the entropy coding algorithm comprises using a compression table according to a general frequency count.

12. A method according to claim 9, wherein applying the entropy coding algorithm comprises using a compression table according to a frequency count of the degrees in the topology list.

13. A method according to claim 1, wherein the vertices have respective geometric coordinates, and wherein providing the stream of signals comprises providing a list of the coordinates.

14. A method according to claim 13, wherein providing the coordinate list comprises compressing the coordinates.

15. A method according to claim 14, wherein compressing the coordinates comprises representing the coordinates of at least one of the vertices as an offset from a respective predicted value.

16. A method according to claim 15, wherein the predicted value is calculated based on coordinates of a plurality of previous vertices in the consecutive order.

17. A method according to claim 15, wherein compressing the coordinates comprises representing the offsets using a codebook.

18. A method according to claim 13, and comprising quantizing the coordinates.

19. A method according to claim 18, wherein quantizing the coordinates comprises adaptively quantizing the coordinates responsive to a local characteristic of the mesh.

20. A method according to claim 1, wherein providing the coded stream of signals comprises storing the stream of signals in a memory.

21. A method according to claim 1, wherein providing the coded stream of signals comprises transferring the stream of signals over a network.

22. A method according to claim 1, wherein arranging the vertices in the consecutive order comprises arranging the vertices such that most triangles in the mesh are defined by sub-groups of three vertices, including two consecutive vertices in the order and one preceding vertex which precedes the two consecutive vertices in the order.

23. A method for compressing a mesh including a plurality of vertices having geometric coordinates, comprising:

arranging the vertices in a consecutive order;

compressing the coordinates so as to generate a compressed coordinate list in which the coordinates of at least one of the vertices are represented as an offset from a predicted value, which is calculated based on the coordinates of a plurality of the preceding vertices selected from the consecutive order using topology information relating to at least some of the vertices in the mesh to select a subset of the preceding vertices for the purpose of prediction; and providing a coded stream of signals comprising the compressed coordinate list.

24. A method according to claim 23, wherein the predicted value is calculated based on the coordinates of at least three preceding vertices.

25. A method according to claim 23, wherein the predicted value is calculated by calculating coordinates of a point which forms a parallelogram together with an adjacent triangle.

26. A method according to claim 25, wherein the predicted value is calculated by calculating an estimated crease angle between an adjacent triangle and a triangle including the point.

27. A method according to claim 26, wherein calculating the estimated crease angle comprises determining a crease angle between adjacent planes which include pairs of neighboring triangles.

28. A method according to claim 26, wherein calculating the estimated crease angle comprises finding at least one pair of triangles which has a common edge closest to parallelism with an edge about which the crease angle is estimated.

29. A method according to claim 28, wherein the at least one pair of triangles comprises at least two pairs of triangles which have respective crease angles therebetween, and the estimated crease angle comprises an average of the crease angles of the at least two pairs of triangles.

30. A method for decoding a stream of signals into a mesh including a plurality of vertices, each vertex characterized by a degree equal to the number of edges incident thereon, comprising:

extracting a topology list, including a series of numbers representing the degrees of the vertices in a consecutive order, from the stream; and generating the mesh with the vertices having the degrees in accordance with the topology list.

31. A method according to claim 30, wherein extracting the topology list comprises extracting at least one sub-list in which the degrees of the vertices are ordered along a predetermined contour of the mesh.

32. A method according to claim 31, wherein the predetermined contour has a generally spiral shape.

33. A method according to claim 31, wherein the at least one sub-list comprises a plurality of sub-lists, and wherein extracting the topology list comprises extracting an indication of the vertices at which two or more of the sub-lists meet.

34. A method according to claim 30, and comprising identifying dummy vertices and removing them from the mesh.

35. A method according to claim 30, wherein the stream of signals comprises compressed data, and wherein extracting the topology list comprises decompressing the data to determine the series of numbers representing the degrees.

36. A method according to claim 35, wherein decompressing comprises decompressing according to an entropy coding algorithm.

37. A method according to claim 36, wherein decompressing according to the entropy coding algorithm comprises using a compression table according to a general frequency count.

38. A method according to claim 30, and comprising extracting a coordinate list representing geometric coordinates of the vertices from the stream and decompressing the coordinate list.

39. A method according to claim 38, wherein decompressing the coordinate list comprises extracting from the coordinate list at least one value representing an offset between an actual coordinate and a predicted coordinate.

40. A method according to claim 39, and comprising calculating a predicted value for at least one vertex corresponding to the at least one value representing the offset, and subtracting the offset from the predicted value to obtain the actual coordinate.

41. A method according to claim 30, and comprising rendering the mesh.

42. A method according to claim 30, and comprising storing the mesh.

43. A method for decompressing a compressed stream of signals into a mesh having a plurality of vertices having geometric coordinates, comprising:

extracting a coordinate list from the stream, representing the coordinates of the vertices in a consecutive order;

extracting from the coordinate list at least one value representing an offset from an actual coordinate of one of the vertices to a predicted value of the coordinate, which is calculated based on the coordinates of a plurality of the preceding vertices selected from the consecutive order using topology information relating to at least some of the vertices in the mesh to select a subset of the preceding vertices for the purpose of prediction;

calculating the predicted value of the vertex coordinate, and subtracting the offset from the predicted value to obtain the actual coordinate; and providing the mesh responsive to the coordinate.

44. A method according to claim 43, wherein the predicted value is calculated based on the coordinates of at least three preceding vertices in the consecutive order.

45. A method according to claim 43, wherein the predicted value is calculated by calculating coordinates of a point which forms a parallelogram together with an adjacent triangle.

46. A method according to claim 45, wherein the predicted value is calculated by calculating an estimated crease angle between an adjacent triangle and a triangle including the point.

47. A method according to claim 46, wherein calculating the estimated crease angle comprises determining a crease angle between adjacent planes which include pairs of neighboring triangles.

48. A method according to claim 46, wherein calculating the estimated crease angle comprises finding at least one pair of triangles which has a common edge closest to parallelism with an edge about which the crease angle is estimated.

49. A method according to claim 48, wherein the at least one pair of triangles comprises at least two pairs of triangles which have respective crease angles therebetween, and the estimated crease angle comprises an average of the crease angles of the at least two pairs of triangles.

50. A method according to claim 43, wherein decompressing the coordinates comprises decoding the coordinate list using a codebook.

51. A method according to claim 43, and comprising displaying the mesh on a display.

52. A method according to claim 43, wherein providing the mesh comprises rendering the mesh.

53. A method according to claim 43, wherein providing the mesh comprises storing the mesh.

54. Apparatus for compressing a mesh having a plurality of vertices, each vertex characterized by a degree equal to the number of edges incident thereon, comprising:
a compression processor, which receives the mesh and orders the vertices therein in a consecutive order and generates a topology list including the degrees of the vertices in the consecutive order, and which outputs a coded stream of signals comprising the topology list.

55. Apparatus according to claim 54, wherein the compression processor arranges the vertices in at least one sub-list in which the vertices are ordered along a contour of the mesh.

56. Apparatus according to claim 55, wherein the contour has a generally spiral shape.

57. Apparatus according to claim 55, wherein the at least one sub-list comprises a number of sub-lists, the number determined according to a characteristic of the mesh.

58. Apparatus according to claim 57, wherein the processor inserts into the topology list an indication of the vertices at which two of the number of sub-lists meet.

59. Apparatus according to claim 55, wherein the processor orders the vertices such that a topology of the mesh may be regenerated using substantially only the topology list.

60. Apparatus according to claim 55, wherein the processor checks whether the mesh has an open boundary and adds a dummy vertex which is connected to vertices on the open boundary, if the mesh has an open boundary.

61. Apparatus according to claim 55, wherein the processor compresses the topology list.

62. Apparatus according to claim 61, wherein the processor applies an entropy coding algorithm to compress the topology list.

63. Apparatus according to claim 61, wherein the processor applies a Huffman algorithm to compress the topology list.

64. Apparatus according to claim 62, wherein the processor applies the entropy coding algorithm using a compression table generated according to a general frequency count.

65. Apparatus according to claim 62, wherein the processor applies the entropy coding algorithm using a compression table generated according to a frequency count of the degrees in the topology list.

66. Apparatus according to claim 54, wherein the processor compresses geometric coordinates of the vertices so as to generate a coordinate list, and wherein the stream of signals comprises the coordinate list.

67. Apparatus according to claim 66, wherein the processor compresses the coordinates by representing the coordinates of at least some of the vertices as an offset from a predicted value.

68. Apparatus according to claim 67, wherein the processor calculates the predicted value based on coordinates of a plurality of preceding vertices in the consecutive order.

69. Apparatus according to claim 67, wherein the processor represents the offsets using a codebook.

70. Apparatus for compressing a mesh including a plurality of vertices having geometric coordinates, comprising:
a compression processor which arranges the vertices in a consecutive order and compresses the coordinates so as to generate a compressed coordinate list in which the coordinates of at least some of the vertices are represented as an offset from a predicted value, which is calculated based on the coordinates of a plurality of the preceding vertices selected from the consecutive order using topology information relating to at least some of the vertices in the mesh to select a subset of the preceding vertices for the purpose of prediction, and which outputs a compressed stream of signals comprising the coordinate list.

71. Apparatus according to claim 70, wherein the processor calculates the predicted value based on the coordinates of at least three preceding vertices.

72. Apparatus according to claim 70, wherein the processor calculates the predicted value by calculating coordinates of a point which forms a parallelogram together with an adjacent triangle.

73. Apparatus according to claim 72, wherein the processor calculates the predicted value by calculating an estimated crease angle between an adjacent triangle and a triangle including the point.

74. Apparatus according to claim 73, wherein the processor calculates the estimated crease angle by determining a crease angle between adjacent planes which include pairs of neighboring triangles.

75. Apparatus according to claim 73, wherein the processor calculates the estimated crease angle by finding at least one pair of triangles which has a common edge closest to parallelism with an edge about which the crease angle is estimated.

76. Apparatus according to claim 75, wherein the at least one pair of triangles comprises at least two pairs of triangles which have respective crease angles therebetween, and the estimated crease angle comprises an average of the crease angles of the at least two pairs of triangles.

77. Apparatus according to claim 54, and comprising a memory in which the stream of signals is stored.

78. Apparatus according to claim 54, wherein the processor transfers the stream of signals over a network.

79. Apparatus for decoding a stream of signals into a mesh including a plurality of vertices, each vertex characterized by a degree equal to the number of edges incident thereon, comprising:
a decompression processor which extracts a topology list, including a series of numbers representing the degrees of the vertices in a consecutive order, from the stream, and which generates and renders the mesh with the vertices having the degrees in accordance with the topology list.

80. Apparatus according to claim 79, wherein the processor extracts at least one sub-list in which the degrees of the vertices are ordered along a predetermined contour of the mesh.

81. Apparatus according to claim 80, wherein the predetermined contour has a generally spiral shape.

82. Apparatus according to claim 80, wherein the at least one sub-list comprises a plurality of sub-lists, and wherein the processor extracts an indication of the vertices at which two or more of the sub-lists meet.

83. Apparatus according to claim 79, wherein the processor identifies dummy vertices and removes them from the mesh.

84. Apparatus according to claim 79, wherein the stream of signals comprises compressed data, and wherein the processor decompresses the data to determine the series of numbers representing the degrees.

85. Apparatus according to claim 84, wherein the processor decompresses the data using an entropy algorithm.

86. Apparatus according to claim 85, wherein the processor decompresses the data using a compression table according to a general frequency count.

87. Apparatus according to claim 79, wherein the processor extracts a coordinate list representing geometric coordinates of the vertices from the stream and decompresses the coordinate list.

88. Apparatus according to claim 87, wherein the processor extracts from the coordinate list at least one value representing an offset between an actual coordinate and a predicted coordinate.

89. Apparatus according to claim 88, wherein the processor calculates the predicted coordinate for at least one vertex corresponding to the at least one value representing the offset, and subtracts the offset from the predicted coordinate to obtain the actual coordinate.

90. Apparatus according to claim 89, wherein the processor calculates the predicted value based on the coordinates of at least three preceding vertices in the consecutive order.

91. Apparatus according to claim 89, wherein the processor calculates the predicted value based on topology information relating to a plurality of the vertices in the mesh.

92. Apparatus according to claim 90, wherein the processor calculates the predicted value by calculating coordinates of a point which forms a parallelogram together with an adjacent triangle.

93. Apparatus according to claim 90, wherein the processor calculates the predicted value by calculating an estimated crease angle between an adjacent triangle and a triangle including the point.

94. Apparatus according to claim 93, wherein the processor calculates the estimated crease angle by determining a crease angle between adjacent planes which include pairs of neighboring triangles.

95. Apparatus according to claim 87, wherein the processor decompresses the coordinate list using a codebook.

96. Apparatus according to claim 79, and comprising a display to which the processor renders the mesh.

97. Apparatus for decompressing a compressed stream of signals into a mesh having a plurality of vertices having geometric coordinates, comprising:

a decompression processor, which extracts a coordinate list from the stream representing the coordinates of the vertices in a consecutive order, extracts from the coordinate list at least one value representing an offset from an actual coordinate of one of the vertices to a predicted value of the coordinate, which predicted value is calculated based on the coordinates of a plurality of the preceding vertices selected from the consecutive order using topology information relating to at least some of the vertices in the mesh to select a subset of the preceding vertices for the purpose of prediction, and which processor calculates the predicted value of the vertex coordinate and subtracts the offset from the predicted value to obtain the actual coordinate, and renders the mesh responsive to the coordinate.

* * * * *